US012698794B2

(12) United States Patent
Clearman et al.

(10) Patent No.: US 12,698,794 B2
(45) Date of Patent: Aug. 4, 2026

(54) KEY-LOCKED CARABINER DEVICES, SYSTEMS, AND METHODS

(71) Applicant: Clearman Labs, LLC, Boulder, CO (US)

(72) Inventors: Christopher Aaron Clearman, Boulder, CO (US); Kevin Wruble, Fort Collins, CO (US)

(73) Assignee: Clearman Labs, LLC, Boulder, CO (US)

( * ) Notice: Subject to any disclaimer, the term of this patent is extended or adjusted under 35 U.S.C. 154(b) by 0 days.

(21) Appl. No.: 18/680,147

(22) Filed: May 31, 2024

(65) Prior Publication Data

US 2024/0401634 A1     Dec. 5, 2024

Related U.S. Application Data

(60) Provisional application No. 63/469,988, filed on May 31, 2023.

(51) Int. Cl.
*F16B 45/02* (2006.01)
*E05B 21/00* (2006.01)

(52) U.S. Cl.
CPC ............ *F16B 45/023* (2021.05); *E05B 21/00* (2013.01)

(58) Field of Classification Search
CPC ............................... F16B 45/023; E05B 21/00
See application file for complete search history.

(56) References Cited

U.S. PATENT DOCUMENTS

| | | | | |
|---|---|---|---|---|
| 1,381,405 A * | 6/1921 | Dunham | ............... | F16B 45/027 24/600.2 |
| 1,595,264 A * | 8/1926 | Treiman | ................ | F16B 45/028 24/600.2 |
| 3,121,275 A * | 2/1964 | Evans | ....................... | B66C 1/36 24/600.1 |
| 7,114,356 B1 * | 10/2006 | Yu | ........................ | E05B 37/0034 70/21 |
| 2016/0047409 A1 * | 2/2016 | Fitz-Earle | ............. | F16B 45/028 24/456 |
| 2021/0189766 A1 * | 6/2021 | Lai | ......................... | E05B 35/105 |

* cited by examiner

*Primary Examiner* — David M Upchurch
(74) *Attorney, Agent, or Firm* — Wilson Patent Law, LLC

(57)          ABSTRACT

Key-locked carabiner devices, systems, and methods are provided in accordance with various embodiments. Some embodiments include a carabiner and a lock coupled with the carabiner that locks the gate of the carabiner. The lock may be operated with a key to form a key-operated lock. The key-operated lock may be positioned within a nose portion of the carabiner. The key-operated lock coupled with the carabiner may include a bolt that extends from the nose portion of the carabiner into an aperture of the gate of the carabiner to preclude the gate of the carabiner from opening. Some embodiments utilize a key-operated lock that may be opened utilizing a TSA007 key, while the key designed specifically for the key-operated lock may not open other locks that a TSA007 key may open. Some embodiments include key-locked carabiners that may be designed to facilitate alignment of the carabiner's gate.

29 Claims, 25 Drawing Sheets

101

101

110

138

120

130

115

136

144

141

140

101

120

110

127

135

127

130

147

115

136

144

141

140

152

151

152

151

1100

Insert a key into a lock coupled with a carabiner

1110

Rotate the key inserted into the lock coupled with the carabiner such that a gate of the carabiner is locked into a closed position.

1120

1100-a

Insert a key into a rotating element of a locking mechanism while pushing a sliding element to engage a bolt 1110-a Rotate the rotating element from an unlocked position to a lock positioned 1120-a Remove the key from the rotating element while leaving the bolt in the locked position

1130

KEY-LOCKED CARABINER DEVICES, SYSTEMS, AND METHODS

CROSS-REFERENCES TO RELATED APPLICATIONS

This application is a non-provisional patent application claiming priority benefit of U.S. provisional patent application Ser. No. 63/469,988, filed on May 31, 2023 and entitled "KEY-LOCKED CARABINER DEVICES, SYSTEMS, AND METHODS," the entire disclosure of which is herein incorporated by reference for all purposes.

BACKGROUND

A variety of tools and techniques may be utilized to secure items from theft including a variety of locking mechanisms. Carabiners have been utilized to connect items including some configurations that provide for locking. However, locking carabiners typically may not provide security for items from theft as they may be opened by hand. There may be a need for new tools and techniques that may provide more security from theft while also providing for the ease of use carabiners for connecting items.

SUMMARY

Key-locked carabiner devices, systems, and methods are provided in accordance with various embodiments. Some embodiments include a key-operated lock that may be integrated with a carabiner; the key-operated lock may include a rotating element, a sliding element, and a spring. Some embodiments utilize locks that may be opened utilizing a TSA007 key or other standardized keys, while the key designed specifically for the key-operated lock may not open other locks that a TSA007 key or other standardized keys may open. Some embodiments include key-locked carabiners that may be designed to facilitate alignment of the carabiner's gate for locking and/or unlocking purposes utilizing angled faces of the carabiner nose and gate. The key-operated lock may be utilized in other devices besides a carabiner.

Some embodiments include a device that includes a carabiner and a lock coupled with the carabiner that locks the gate of the carabiner. In some embodiments, the lock is operated with a key to form a key-operated lock. In some embodiments, the key-operated lock is positioned within a nose portion of the carabiner. In some embodiments, the key-operated lock coupled with the carabiner includes a bolt that extends from the nose portion of the carabiner into an aperture of the gate of the carabiner to preclude the gate of the carabiner from opening.

In some embodiments of the device, the key-operated lock coupled with the carabiner includes a first element that is coupled with the bolt and slides within the nose portion of the carabiner to extend the bolt from the nose portion of the carabiner into the aperture of the gate of the carabiner to preclude the gate of the carabiner from opening. In some embodiments, the key pushes against a portion of the first element to extend the bolt from the nose portion of the carabiner into the aperture of the gate of the carabiner to preclude the gate of the carabiner from opening. In some embodiments, the key-operated lock coupled with the carabiner includes a second element such that the key inserts into the second element of the key-operated lock and the key rotates the second element of the key-operated lock within the nose portion of the carabiner. In some embodiments, the first element of the key-operated lock and the second element of the key-operated lock each include one or more lugs where a first lug of the first element of the key-operated lock slides along a first lug of the second element of the key-operated lock with the key being inserted into the second element of the key-operated lock.

In some embodiments of the device, the first lug of the first element of the key-operated lock clears an end of the first lug of the second element of the key-operated lock such that the second element of the key-operated lock rotates with a rotation of the key. In some embodiments, the first lug of the first element of the key-operated lock slides into a gap formed between the first lug of the second element of the key-operated lock and a second lug of the second element of the key-operated lock such that the bolt remains in the aperture of the gate of the carabiner to lock the gate of the carabiner in place.

In some embodiments of the device, the first lug of the first element of the key-operated lock sliding along the first lug of the second element of the key-operated lock with the key being inserted into the second element of the key-operated lock includes the first lug of the first element of the key-operated lock sliding along a first side of the first lug of the second element of the key-operated lock with the key being inserted into the second element of the key operated lock. In some embodiments, the first lug of the first element of the key-operated lock slides along a second side of the first lug of the second element of the key-operated lock such that the bolt remains in the aperture of the gate of the carabiner to lock the gate of the carabiner in place with the key being removed from the second element of the key-operated lock.

In some embodiments of the device, the key-operated lock includes a spring that pushes against the first element of the key-operated lock. In some embodiments, the key includes a standardized key. In some embodiments, the standardized key includes a TSA007 key. In some embodiments, the second element of the key-operated lock includes a shaped groove to accept a matching shaped tip of the key.

In some embodiments of the device, the gate of the carabiner includes at least an angled face or stepped face that matches at least an angled face or stepped face of the nose portion of the carabiner. In some embodiments, the bolt partially extends from at least the angled face or the stepped face of the nose portion of the carabiner in an unlocked state.

Some embodiments of the device further include an aperture in the nose portion of the carabiner, a pin that inserts into the aperture of the nose portion of the carabiner, and a groove in the second element of the key-operated lock that the pin runs through such that the second element of the key-operated lock is retained within the nose portion of the carabiner and the second element of the key-operated lock rotates with the pin running through the groove of the second element of the carabiner.

Some embodiments include a method that includes inserting a key into a lock coupled with a carabiner and rotating the key inserted into the lock coupled with the carabiner such that a gate of the carabiner is locked into a closed position. In some embodiments, inserting the key into the lock coupled with the carabiner includes extending a bolt of the lock into an aperture of the gate of the carabiner that precludes the gate from opening. In some embodiments, inserting the key into the lock coupled with the carabiner includes sliding a sliding element of the lock such that the bolt of the lock extends into the aperture of the gate of the carabiner. In some embodiments, inserting the key into the lock coupled with the carabiner includes inserting the key into a rotating element of the lock.

In some embodiments of the method, sliding the sliding element of the lock includes sliding a first lug of the sliding element of the lock with respect to a first lug of the rotating element of the lock. In some embodiments, rotating the key inserted into the lock coupled with the carabiner includes rotating the rotating element of the lock after the first lug of the sliding element of the lock clears an end of the first lug of the rotating element of the lock. In some embodiments, the gate of the carabiner is locked in a closed position when the first lug of the sliding element of the lock slides into a gap formed between the first lug of the rotating element and a second lug of the rotating element.

Some embodiments of the method further include actuating the sliding element of the lock with a spring. In some embodiments, rotating the rotating element of the lock after the first lug of the sliding element of the lock clears the end of the first lug of the rotating element of the lock includes rotating the rotating element of the lock with respect to a pin inserted through one or more apertures of the carabiner. In some embodiments, the pin runs through a groove formed in the rotating element of the lock.

In some embodiments of the method, sliding the first lug of the sliding element of the lock with respect to the first lug of the rotating element of the lock includes sliding the first lug of the sliding element of the lock with respect to a first side of the first lug of the rotating element of the lock. In some embodiments, the gate of the carabiner is locked in a closed position when the first lug of the sliding element of the lock slides with respect to a second side of the first lug of the rotating element as the key is removed from the rotating element.

Some embodiments of the method utilize a standardized key. The standardized key may include a TSA007 key. In some embodiments, inserting the key into the lock coupled with the carabiner includes inserting the key into a nose portion of the carabiner. In some embodiments, the lock coupled with the carabiner is positioned within the nose portion of the carabiner.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label.

Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
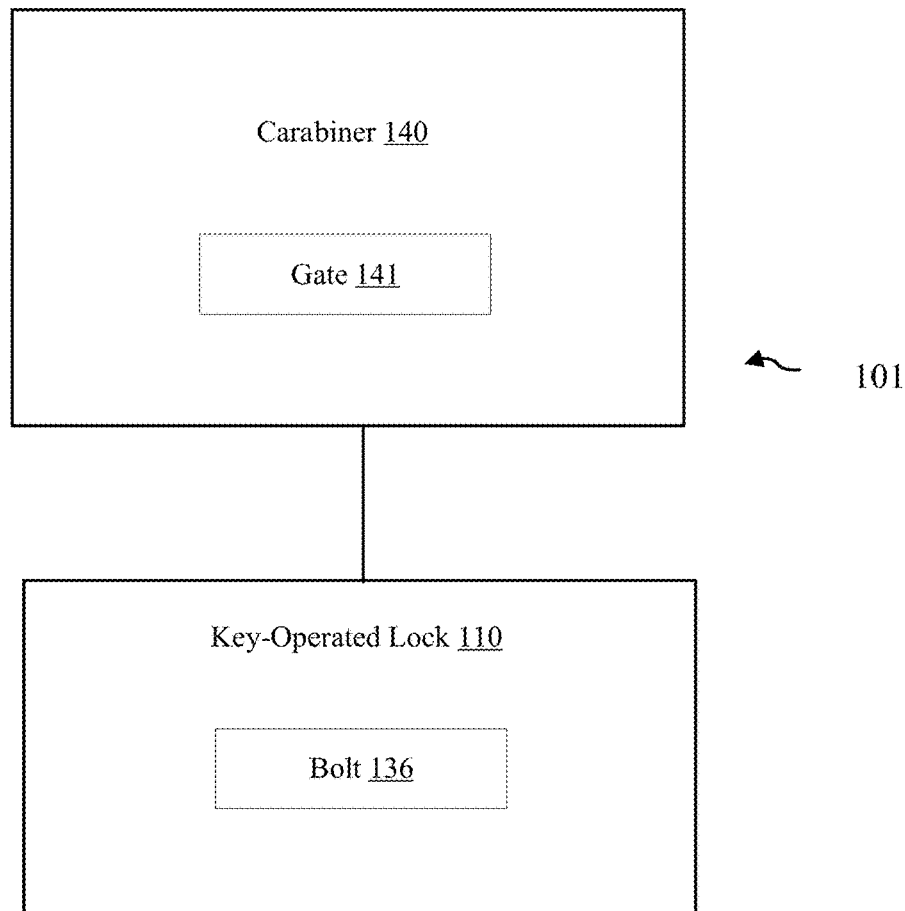
FIG. 1A shows a key-locked carabiner system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Key-locked carabiner devices, systems, and methods are provided in accordance with various embodiments. For example, various embodiments may provide for travel locks where a lock and/or carabiner may be utilized. The various embodiments may help prevent grab-and-go thefts using key-locked carabiner devices, systems, and/or methods in accordance with various embodiments.

Some embodiments include a key-locked carabiner device that includes a key-operated lock positioned in a nose portion of the carabiner. A key may be inserted into the key-operated lock to engage a bolt with a portion of a gate of the carabiner. Some embodiments of the key-operated lock include a rotating element, a sliding element, and a spring. The key-operated lock itself may be utilized in other devices besides a carabiner, such as u-shaped lock or other devices that may benefit from a key-operated lock where the bolt is designed to move in a linear direction parallel to a rotation axis of the key.

Some embodiments utilize key-operated locks that may be opened utilizing a TSA007 key, while the key designed specifically for the key-operated lock may not open other locks that a TSA007 key may open. For example, the key for the key-operated lock may include a v-shaped tip, similar to that found with a TSA007 key. Some key-operated locks may also include a zig zag or z-shape that may be matched in cross section by the corresponding key. This may help thwart the use of a screwdriver or other similar devices from opening the key-operated lock. Other shapes may be utilized, including, but not limited to circular, angular, and/or other cross sections. Some embodiments utilize other standardized keys.

Some embodiments include key-locked carabiners that may be designed to facilitate alignment of the carabiner's gate for locking and/or unlocking purposes. For example, angled or stepped faces may be formed in the carabiner gate and nose of the carabiner that may allow a portion of the key-operated lock's bolt to extend beyond the angled or stepped face of the nose of the carabiner and thus catch a surface of an opening formed in the angled or stepped face of the gate of the carabiner when the gate of the carabiner closes. This may help keep the bolt aligned with the gate and may help avoid tolerance issues in design.

Turning now to FIG. 1A, FIG. 1B, FIG. 1C, and FIG. 1D, a key-locked carabiner system 100 along various examples of key-locked carabiners 101, key-operated locks 110, and carabiners 140 are provided in accordance with various embodiments.

For example, FIG. 1A shows a key-locked carabiner system 100 that may include a key-operated lock 110 that may include a bolt 136 that may insert into a portion of a gate 141 of the carabiner 140 of the key-locked carabiner system 100 to lock the key-locked carabiner 101. The key-operated lock 110 may withdraw the bolt 136 from the gate 141 to unlock the key-locked carabiner 101. A key 150 may be utilized to lock and to unlock the key-operated lock 110.

The key-locked carabiner 101 generally includes carabiner 140 and the key-operated lock 110 coupled with the carabiner 140 that locks the gate 141 of the carabiner 140. The key-operated lock 110 may be positioned within a nose portion of the carabiner 140. The bolt 136 generally extends from the nose portion of the carabiner 140 into an aperture of the gate 141 of the carabiner 140 to preclude the gate 141 of the carabiner 140 from opening when in a locked state.

Figure 1B:
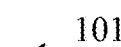
FIG. 1B shows a key-locked carabiner device in accordance with various embodiments.
Figure 1B:
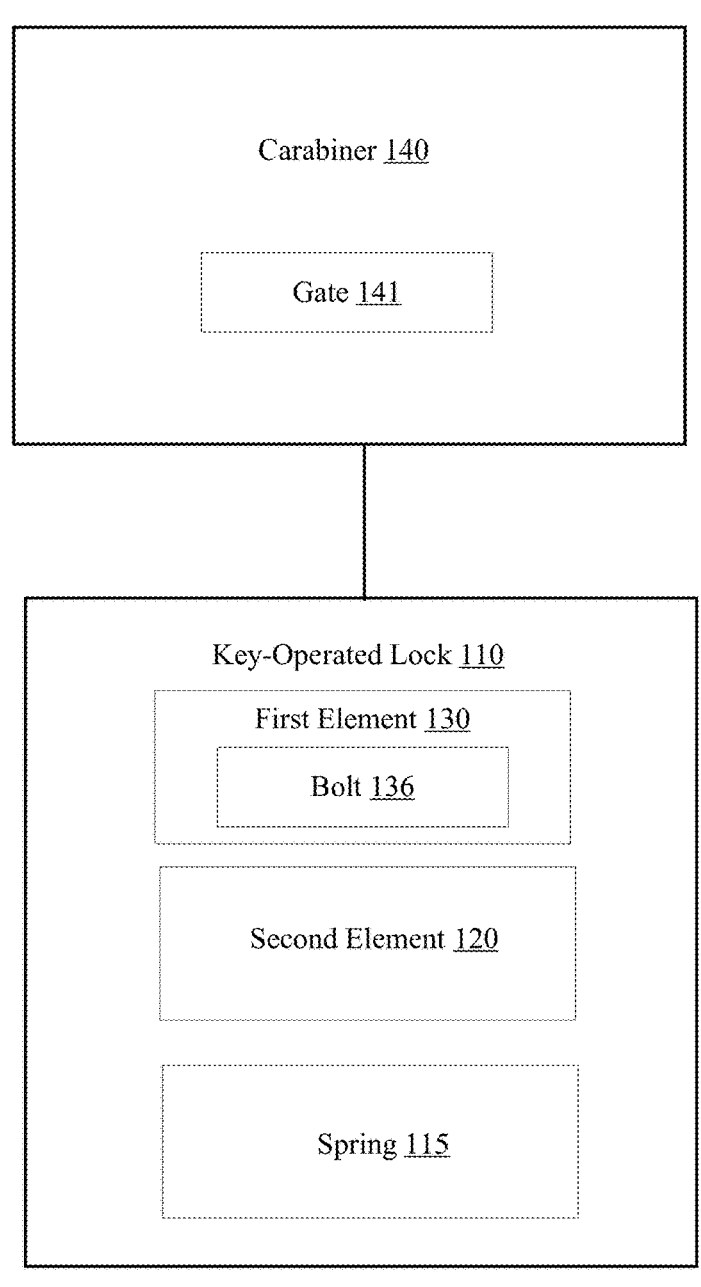

FIG. 1B includes a key-locked carabiner device 101 in accordance with various embodiments, which may be an example of device 101 of FIG. 1A. The device 101 may include a carabiner 140 and a lock 110 coupled with the carabiner 140 that locks a gate 141 of the carabiner 140. In some embodiments, the lock 110 is operated with a key to form a key-operated lock. In some embodiments, the key-operated lock 110 is positioned within a nose portion of the carabiner 140. In some embodiments, the key-operated lock 110 coupled with the carabiner 140 includes a bolt 136 that extends from the nose portion of the carabiner 140 into an aperture of the gate 141 of the carabiner 140 to preclude the gate 141 of the carabiner 140 from opening.

In some embodiments of the device 101, the key-operated lock 101 coupled with the carabiner 140 includes a first element 130 that is coupled with the bolt 136 and slides within the nose portion of the carabiner 140 to extend the bolt 136 from the nose portion of the carabiner 140 into the aperture of the gate 141 of the carabiner 140 to preclude the gate 141 of the carabiner 140 from opening. In some embodiments, the key pushes against a portion of the first element 130 to extend the bolt 136 from the nose portion of the carabiner 140 into the aperture of the gate 141 of the carabiner 140 to preclude the gate 141 of the carabiner 140 from opening. In some embodiments, the key-operated lock 110 coupled with the carabiner 140 includes a second element 120 such that the key inserts into the second element 120 of the key-operated lock 110 and the key rotates the second element 120 of the key-operated lock 110 within the nose portion of the carabiner 140. In some embodiments, the first element 130 of the key-operated lock 110 and the second element 120 of the key-operated lock 110 each include one or more lugs where a first lug of the first element 130 of the key-operated lock 110 slides along a first lug of the second element 120 of the key-operated lock 110 with the key being inserted into the second element 120 of the key-operated lock 110.

In some embodiments of the device 101, the first lug of the first element 130 of the key-operated lock 110 clears an end of the first lug of the second element 120 of the key-operated lock 110 such that the second element 120 of the key-operated lock 110 rotates with a rotation of the key. In some embodiments, the first lug of the first element 130 of the key-operated lock 110 slides into a gap formed between the first lug of the second element 120 of the key-operated lock 110 and a second lug of the second element 120 of the key-operated lock 110 such that the bolt 136 remains in the aperture of the gate 141 of the carabiner 140 to lock the gate 141 of the carabiner 140 in place.

In some embodiments of the device 101, the first lug of the first element 130 of the key-operated lock 110 sliding along the first lug of the second element 120 of the key-operated lock 110 with the key being inserted into the second element 120 of the key-operated lock 110 includes the first lug of the first element 130 of the key-operated lock 110 sliding along a first side of the first lug of the second element 120 of the key-operated lock 110 with the key being inserted into the second element 120 of the key operated lock 110. In some embodiments, the first lug of the first element 130 of the key-operated lock 110 slides along a second side of the first lug of the second element 120 of the key-operated lock 110 such that the bolt 136 remains in the aperture of the gate 141 of the carabiner 140 to lock the gate 141 of the carabiner 140 in place with the key being removed from the second element 120 of the key-operated lock 110.

In some embodiments of the device 101, the key-operated lock 110 includes a spring 115 that pushes against the first element 130 of the key-operated lock 110. In some embodiments, the key includes a standardized key. In some embodiments, the standardized key includes a TSA007 key. In some embodiments, the second element 120 of the key-operated lock 110 includes a shaped groove to accept a matching shaped tip of a key.

In some embodiments of the device 101, the gate 141 of the carabiner 140 includes at least an angled face or stepped face that matches at least an angled face or stepped face of the nose portion of the carabiner 140. In some embodiments, the bolt 136 partially extends from at least the angled face or the stepped face of the nose portion of the carabiner 140 in an unlocked state.

Some embodiments of the device 101 further include an aperture in the nose portion of the carabiner 140, a pin that inserts into the aperture of the nose portion of the carabiner 140, and a groove in the second element 120 of the key-operated lock 110 that the pin runs through such that the second element 120 of the key-operated lock 110 is retained within the nose portion of the carabiner 140 and the second element 120 of the key-operated lock 110 rotates with the pin running through the groove of the second element 120 of the carabiner 140.

Figure 1C:
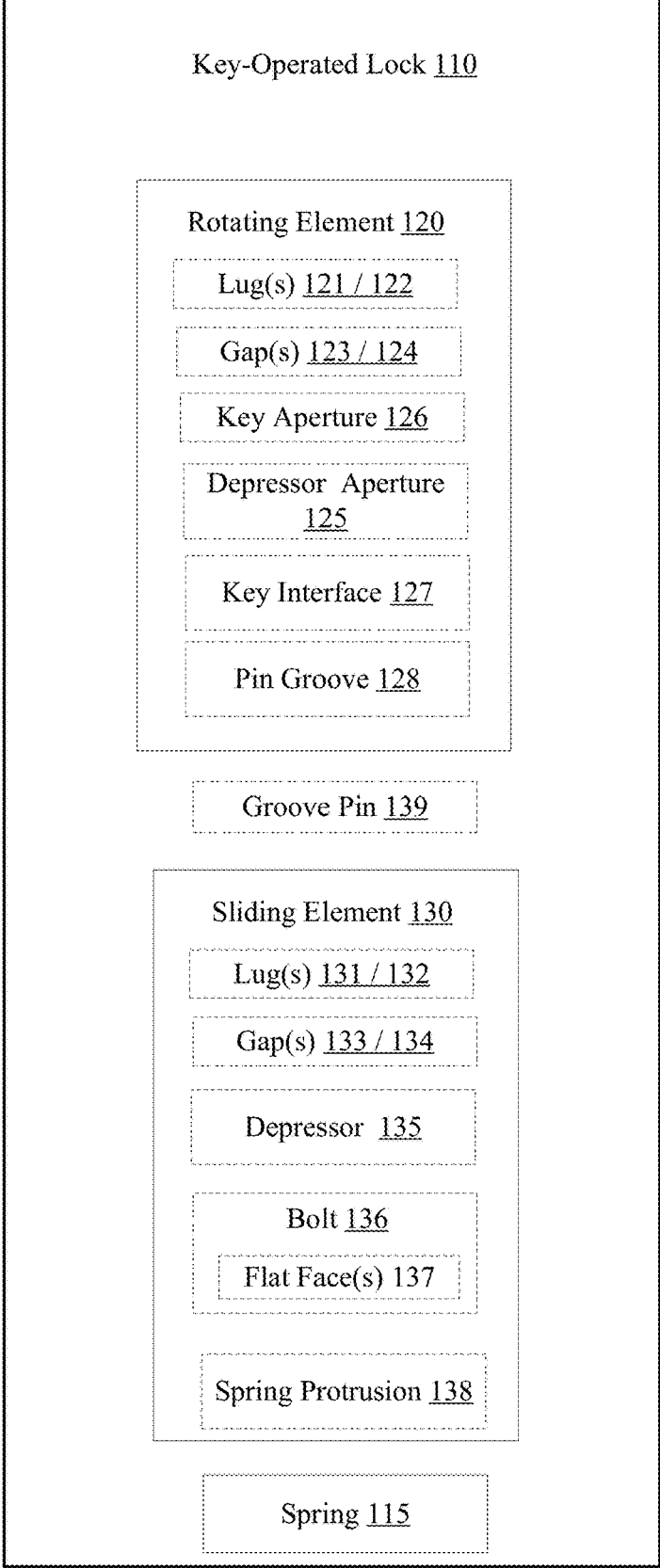
FIG. 1C show a key-operated lock in accordance with various embodiments.

FIG. 1C shows a key-operated lock 110 in accordance with various embodiments, which may be an example of key-operated lock 110 of FIG. 1A and/or FIG. 1B. The key-operated lock 110 may include a rotating element 120 (which may be referred to as a second element) and a sliding element 130 (which may be referred to as a first element). The rotating element 120 may be referred to as a rotating lock element and/or a rotating cylinder. The sliding element 130 may be referred to as a sliding lock element and/or a sliding cylinder. A spring 115 may also be included in the key-operated lock 110; the spring may push against the sliding element 130; for example, a protrusion 138 of the sliding element may push against the spring 115 to actuate the sliding element 130. The protrusion 138 may be formed from portions of the other portions of the sliding element 130 such as lugs, described herein.

The rotating element 120 and the sliding element 130 may have various features that may facilitate locking and unlocking of the key-operated lock 110 utilizing a key. For example, the rotating element 120 may include one or more lugs 121/122; lugs 121/122 may also be referred to as protrusions or flange portions. One or more gaps 123/124 may be formed between multiple lugs of the rotating element 120; the gaps 123/124 may be referred to as slots. Similarly, the sliding element 130 may include one or more lugs 131/132; lugs 131/132 may also be referred to as protrusions or flange portions. One or more gaps 133/134 may be formed between multiple lugs of the sliding element 130. Merely by way of example, the rotating element 120 may include a first lug 121 and a second lug 122; the first lug 121 may be longer than the second lug 122. A first gap 123 and a second gap 124 may be formed between the first lug 121 and the second lug 122; the first gap 123 may be deeper (or longer) than the second gap 124. Merely by way of example, the sliding element 130 may include a first lug 131 and a second lug 132; the first lug 131 may be longer than the second lug 132. A first gap 133 and a second gap 134 may be formed between the first lug 131 and the second lug 132; the first gap 133 may be deeper (or longer) than the second gap 134. Other embodiments may include more or fewer lugs and/or gaps for the respective rotating element 120 and/or the sliding element 130. Other embodiments may utilize different size relationships with respect to the lugs and/or gaps of the respective rotating element 120 and/or the sliding element 130.

In some embodiments, the rotating element 120 may include a key aperture or opening 126 that may accept a key to lock and to unlock the key-operated lock 110. The rotating element 120 may also include an aperture 125 to accept a depressor or protrusion 135 coupled with the sliding element 130. When the key 150 is inserted into the key aperture 126, the depressor 135 may be pushed, which may cause the sliding element 130 to slide. This sliding action may be utilized to shift the lugs 131/132 of the sliding element 130 with respect to the lugs 121/122 of the rotating element 120. A bolt 136 may be coupled with or formed as part of the sliding element 130 that may engage with another component to lock a device, such as a carabiner. For example, an opening 144 in a gate 141 of a carabiner 140 may be configured so that at least a portion of the bolt 136 slides into the opening 144 to lock the gate 141 in place; some of these elements with respect to the carabiner 140 may be shown with respect to FIG. 1D. The bolt 136 may include one or more flat faces 137 that may correspond to one or more flat faces 161 of the carabiner 140 (typically formed in the nose 147 of the carabiner 140 or other keying geometry) to facilitate keeping the sliding element 130 from rotating.

The rotating element 120 may include a groove 128 configured to facilitate keeping the key-operated lock 110 in place while still allowing for rotation of the rotating element 120. A pin 139 may be inserted into the groove 128 along with an aperture 149 in the carabiner 140 to keep the key-operated lock 110 in place.

In some embodiments, a key aperture 126 may include a zig zag or z-shaped opening, though other shapes or profiles may be utilized. The shape of the key aperture 126 may match a shape of the key (such as key 150 of FIG. 1A). The key 150 may include a variety of configurations. In some embodiments, the key 150 may include a zig zag or z-shaped cross section, which may match the shape of the key aperture 126. In some embodiments, the key 150 may include a v-shaped tip, which may match a v-shaped portion 127 of the rotating element 120; v-shaped portion 127 may be referred to as a key interface. This v-shaped tip of the key may match a TSA 007 key's tip, allowing a TSA 007 key to open the key-operated lock 110. The key 150, however, may be designed so it may not open other locks that a TSA 007 key would typically open. Some of these elements and their references may be introduced in earlier or later figures.

Figure 1D:
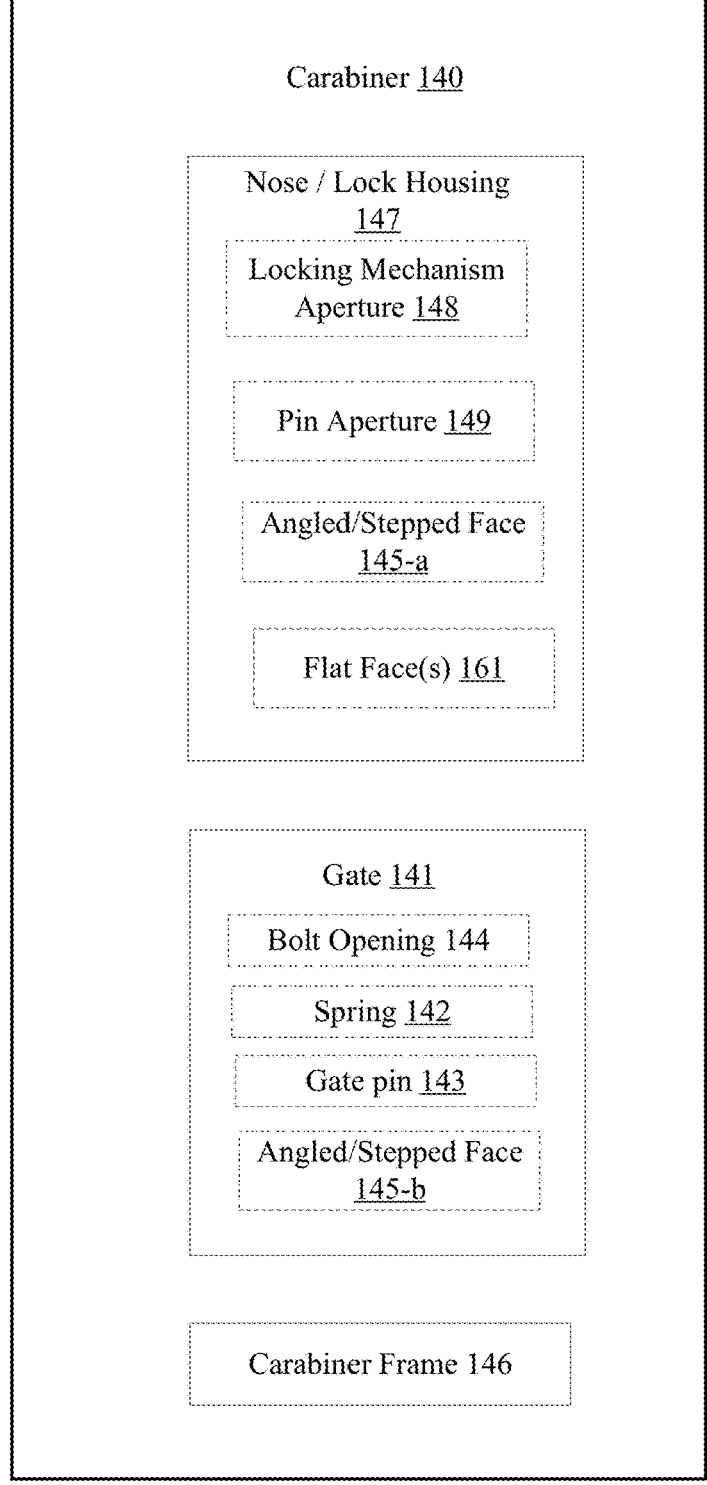
FIG. 1D show a carabiner in accordance with various embodiments.

FIG. 1D shows a carabiner 140 in accordance with various embodiments, which may be an example of carabiner 140 of FIG. 1A and/or FIG. 1B. Carabiner 140 may include a lock (generally referred to as key-operated lock herein and referred to as key-operated lock 110, though not shown in this figure) that may be housed within a nose or locking 147 portion of carabiner 140. The carabiner 140 may include a variety of components or features, such as a gate 141 that may utilize a spring 142 to facilitate opening and closing of the gate 141; a pin 143 may couple the gate 141 to the carabiner 140. The main portion of the carabiner 140 may be referred to as a frame 146. A portion 147 of the carabiner 140 may be configured to house the key-operated lock 110. This portion 147 may be referred to as the nose of the carabiner 140. The nose 147 may include an aperture 148 into which the key-operated lock 110 is secured. For example, a pin aperture 149 may run through the nose 147 into which a pin 139 may be inserted that runs through a groove 128 of the rotating element 120 of the key-operated lock 110. The nose 147 may include an angled and/or stepped face 145-*a* that may match an angled and/or stepped face 145-*b* of the gate 141. The nose 147 may also include one or more flat faces 161 that may match one or more flat faces 137 of bolt 136 to facilitate keeping the bolt 136 and/or sliding element 130 from rotating. Gate 141 may include a bolt opening 144 that may receive a bolt from a key-operated lock, for example.

The references numbers and/or terms utilized with respect to FIG. 1A, FIG. 1B, FIG. 1C, and/or FIG. 1D may be utilized with respect to subsequent figures though they may not always be described again. One may refer back to these figures as a reminder regarding what the references numbers may refer to in subsequent figures.

Figure 2A:
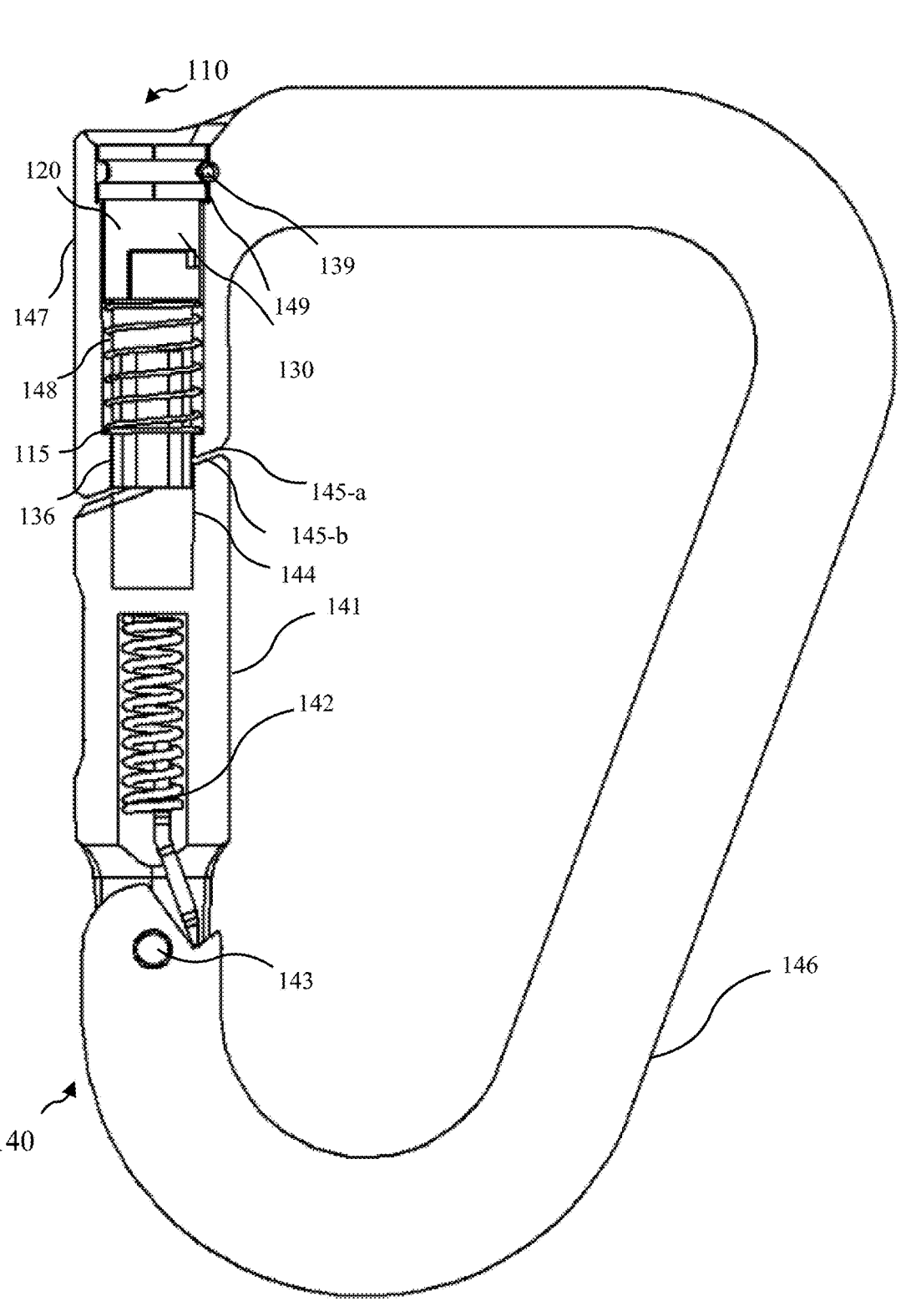
FIG. 2A, FIG. 2B, and FIG. 2C show perspectives on a key-locked carabiner device in accordance with various embodiments.
Figure 2B:
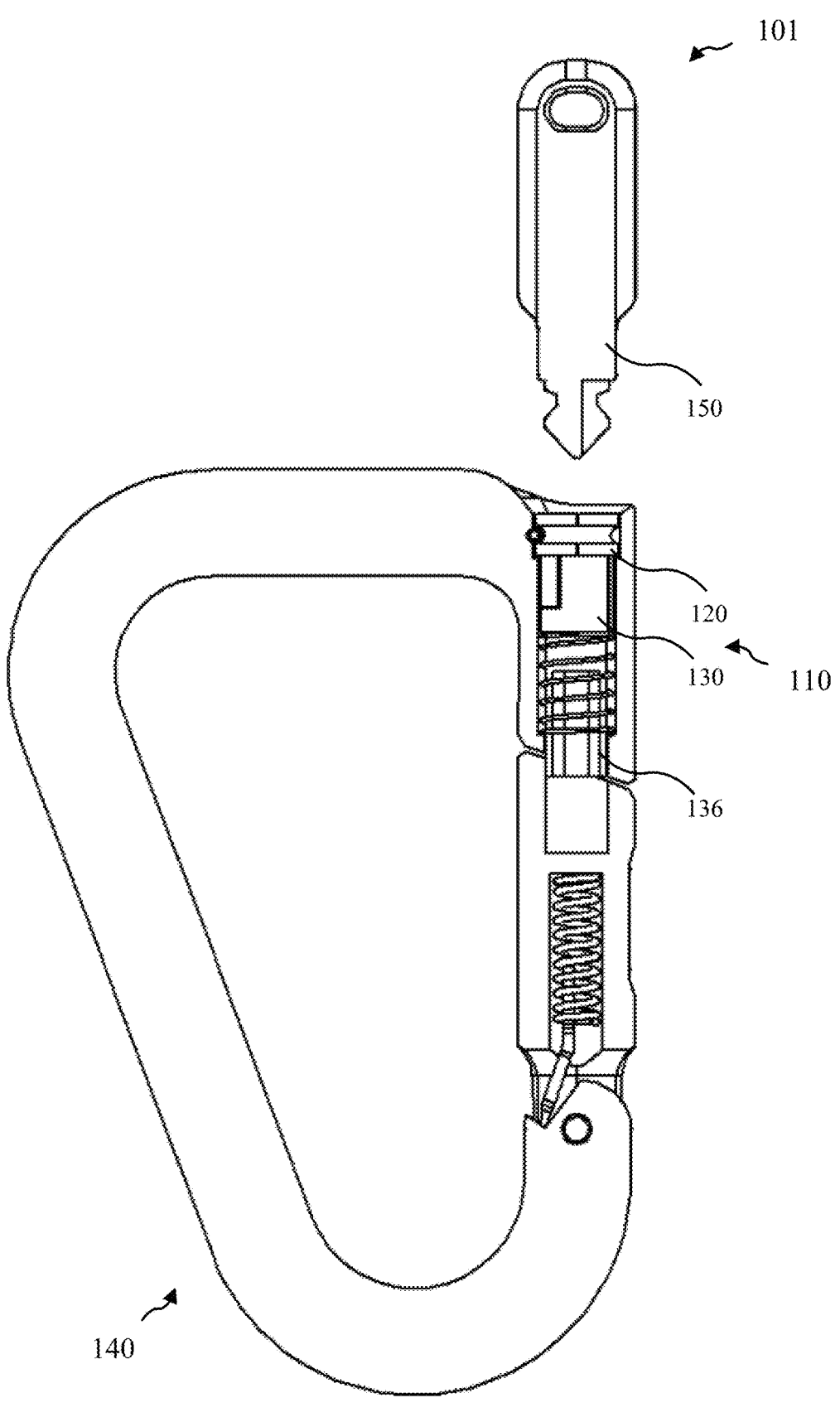
Figure 2C:
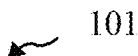

Turning now to FIG. 2A, FIG. 2B, and FIG. 2C, various cutaway perspectives of a key-locked carabiner 101 in accordance with various embodiments are provided. Key-locked carabiner 101 of FIGS. 2A-2C may be an example of key-locked carabiner 101 of FIG. 1A and/or FIG. 1B. Aspects of key-locked carabiner 101 of FIGS. 2A-2C may also be an example of key-operated lock 110 of FIG. 1A, FIG. 1B, and/or FIG. 1C; aspects of key-locked carabiner 101 of FIGS. 2A-2C may also be an example of carabiner 140 of FIG. 1A, FIG. 1B, and/or FIG. 1D. FIG. 2A shows a front-side view of the key-locked carabiner 101 in an unlocked state, while FIG. 2B shows a back-side view of the key-locked carabiner 101 in an unlocked state along with a key 150. FIG. 2C shows the back-side view of the key-locked carabiner 101 in a locked state. In general, the key-locked carabiner 101 utilizes a key-operated lock 110 that may include a first element 130, such as a sliding element, second element 120, such as rotating element 120, and/or a spring 115. When locked, a bolt 136, which may be a portion of the sliding element 130, may be positioned within an opening 144 of the carabiner's gate 141, which may be shown in FIG. 2C. In an unlocked state, a portion of the bolt 136 may hit an upper portion of a side wall of the opening 144 of the carabiner gate 141; this may facilitate aligning the bolt 136 with the opening 144 and may keep the gate 141 from moving beyond proper alignment for locking. This may also help avoid tolerance problems. A face 145-*b* of the gate 141 along with a matching face 145-*a* of the carabiner nose 147 may be angled and/or stepped to facilitate clearance of the extended portion of the bolt 136 that meets the side wall of the opening 144 when the gate 141 may be closed along with allowing for clearance when the gate 141 opens. The spring 115 may push against the sliding element 130; for example, a protrusion 138 of the sliding element 130 may push against the spring 115 to actuate the sliding element 130. The protrusion 138 may be formed from portions of the other portions of the sliding element 130 such as lugs, described elsewhere herein. These figures may also include a carabiner frame 146, a gate spring 142, and/or a gate pin 143.

Figure 3:
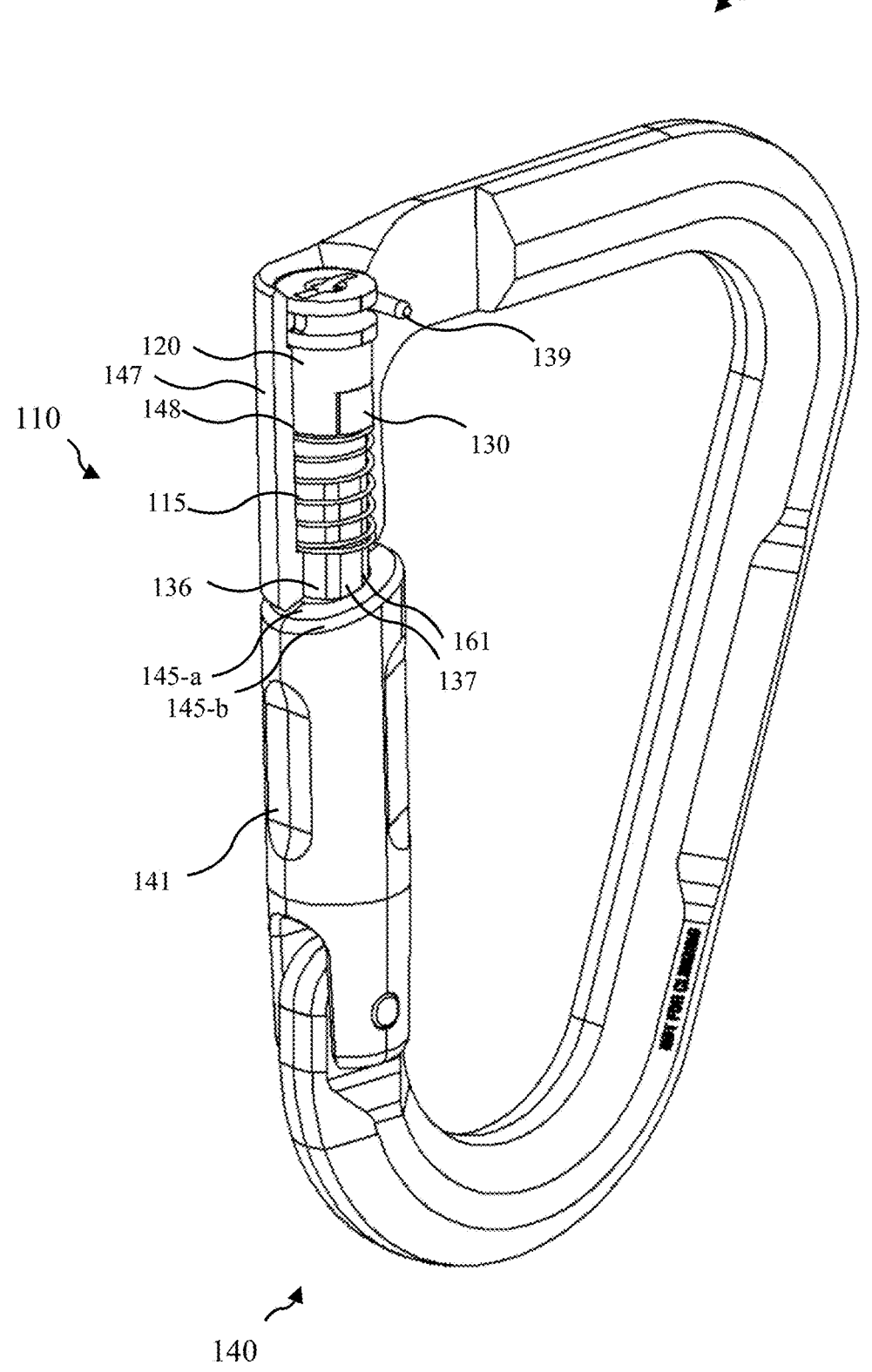
FIG. 3 shows aspects of a key-locked carabiner device in accordance with various embodiments.

FIG. 3 generally shows a partial cutaway perspective view of aspects of a key-locked carabiner 101 with angled or stepped faces 145-*a* and 145-*b* when the gate 141 and the key-operated lock 110 may be in an unlocked state. The angled faces 145-*a* and 145-*b* generally form angles other than 0 degrees or 90 degrees with respect to the main body elements such as nose 147 and/or gate 141, depending on one's measurement perspective. For example, in some embodiments, the angles formed by the faces 145 are approximately 20 degrees (+/−5 degrees). Other angles or stepped geometry may also be utilized. The bolt 136 may include one or more flat faces 137 that may correspond to one or more flat faces 161 of the carabiner 140 (typically formed in the nose 147 of the carabiner 140; here shown with respect to the location of the flat face 161 with a portion of the nose portion 147 removed to show the other elements) to facilitate keeping the sliding element 130 from rotating. In this example, two opposite sides of the bolt 136 may include flat faces 137 corresponding to two flat faces 161 formed in the nose 147 of the carabiner 140, though some embodiments may include more or fewer flat faces. The flat faces 161 formed in the nose 147 of the carabiner 140 may be formed in an opening 148 formed in the nose 147 of the carabiner 140 that holds the key-operated lock 110 components in general. Key-locked carabiner 101 of FIG. 3 may be an example of key-locked carabiner 101 of FIG. 1A, FIG. 1B, and/or FIGS. 2A-2C. Aspects of key-locked carabiner 101 of FIG. 3 may also be an example of key-operated lock 110 of FIG. 1A, FIG. 1B, FIG. 1C, and/or FIGS. 2A-2C; aspects of key-locked carabiner 101 of FIG. 3 may also be an example of carabiner 140 of FIG. 1A, FIG. 1, FIG. 1D, and/or FIGS. 2A-2C.

Figure 4:
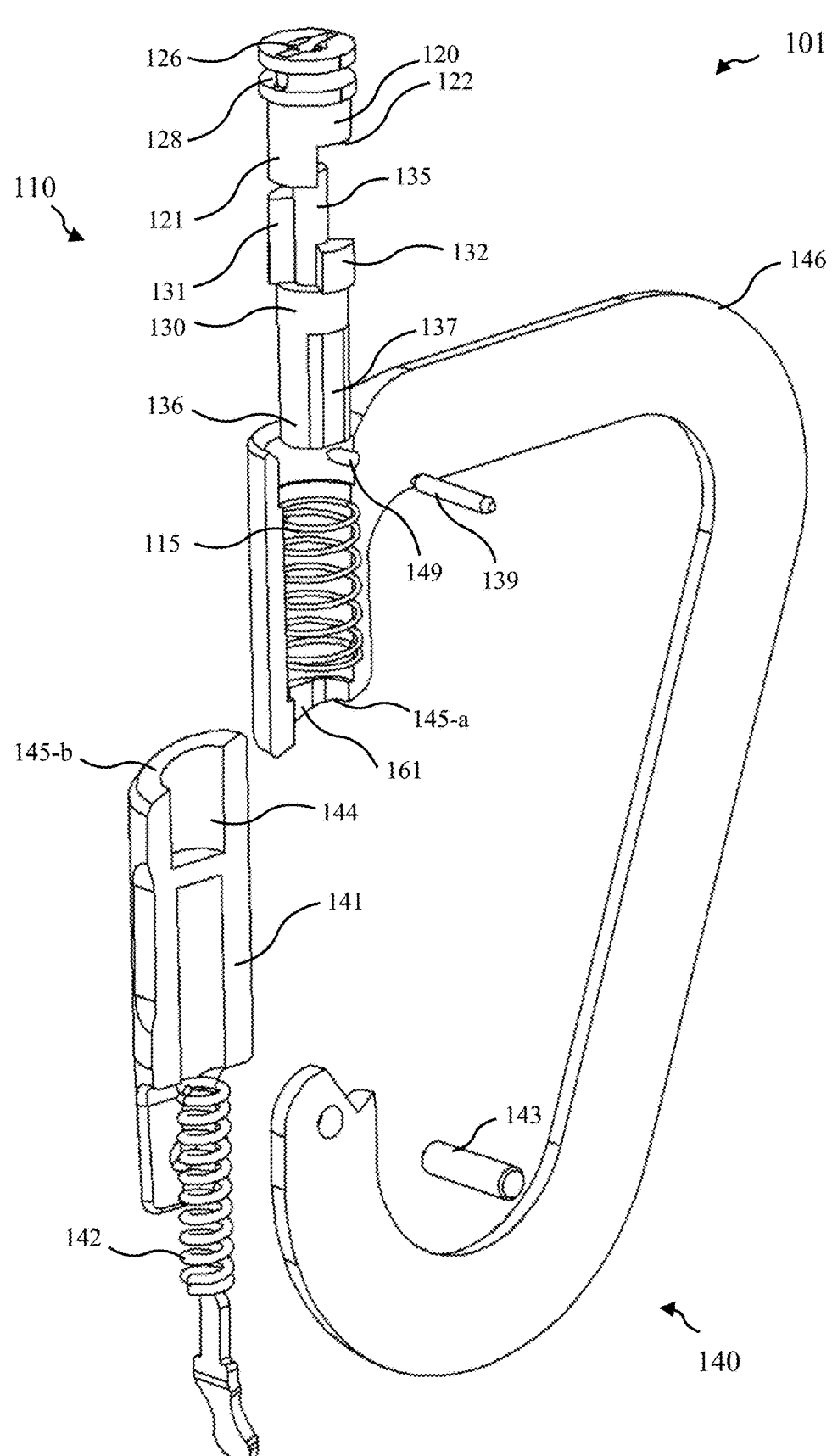
FIG. 4 shows a key-locked carabiner device along with an exploded view of a key-operated lock and a gate of the key-locked carabiner device in accordance with various embodiments.

FIG. 4 shows a key-locked carabiner 101 in accordance with various embodiments with the key-operated lock 110 shown from a cutaway, exploded perspective. Various components are called out of the rotating element 120 and the sliding element 130, which are generally described elsewhere in the detailed description. The key-locked carabiner 101 of FIG. 4 may be an example of key-locked carabiner 101 of FIG. 1A, FIG. 113, FIGS. 2A-2C, and/or FIG. 3. Aspects of key-locked carabiner 101 of FIG. 4 may also be an example of key-operated lock 110 of FIG. 1A, FIG. 1B, FIG. 1C, FIGS. 2A-2C, and/or FIG. 3; aspects of key-locked carabiner 101 of FIG. 4 may also be an example of carabiner 140 of FIG. 1A, FIG. 113, FIG. 1D, FIGS. 2A-2C, and/or FIG. 3.

Figure 5:
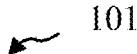
FIG. 5 shows a cross-sectional view of aspects of a key-locked carabiner device in accordance with various embodiments.

FIG. 5 shows a cross-sectional view of a portion of a key-locked carabiner 101 in accordance with various embodiments. In particular, this perspective shows a v-shaped portion 127 of a rotating element 120 of the key-operated lock 110. This may be formed to accept a v-shaped tip of a key; various keys may include a v-shaped tip, including some standardized keys such as a TSA007 key. This configuration may facilitate providing security against the key-operated lock 110 being opened utilizing other devices, such as a flat head screw driver that may not conform to the v-shaped portion 127. A depressor 135 of sliding element 130 may be pushed by the v-shaped tip of the key to slide the sliding element 130 to engage the bolt 136 into the aperture 144 of gate 141 of the carabiner 140. Key-locked carabiner 101 of FIG. 5 may be an example of key-locked carabiner 101 of FIG. 1A, FIG. 113, FIGS. 2A-2C, FIG. 3, and/or FIG. 4. Aspects of key-locked carabiner 101 of FIG. 5 may also be an example of key-operated lock 110 of FIG. 1A, FIG. 1, FIG. 1C, FIGS. 2A-2C, FIG. 3, and/or FIG. 4; aspects of key-locked carabiner 101 of FIG. 5 may also be an example of carabiner 140 of FIG. 1A, FIG. 1, FIG. 1D, FIGS. 2A-2C, FIG. 3, and/or FIG. 4.

Figure 6A:
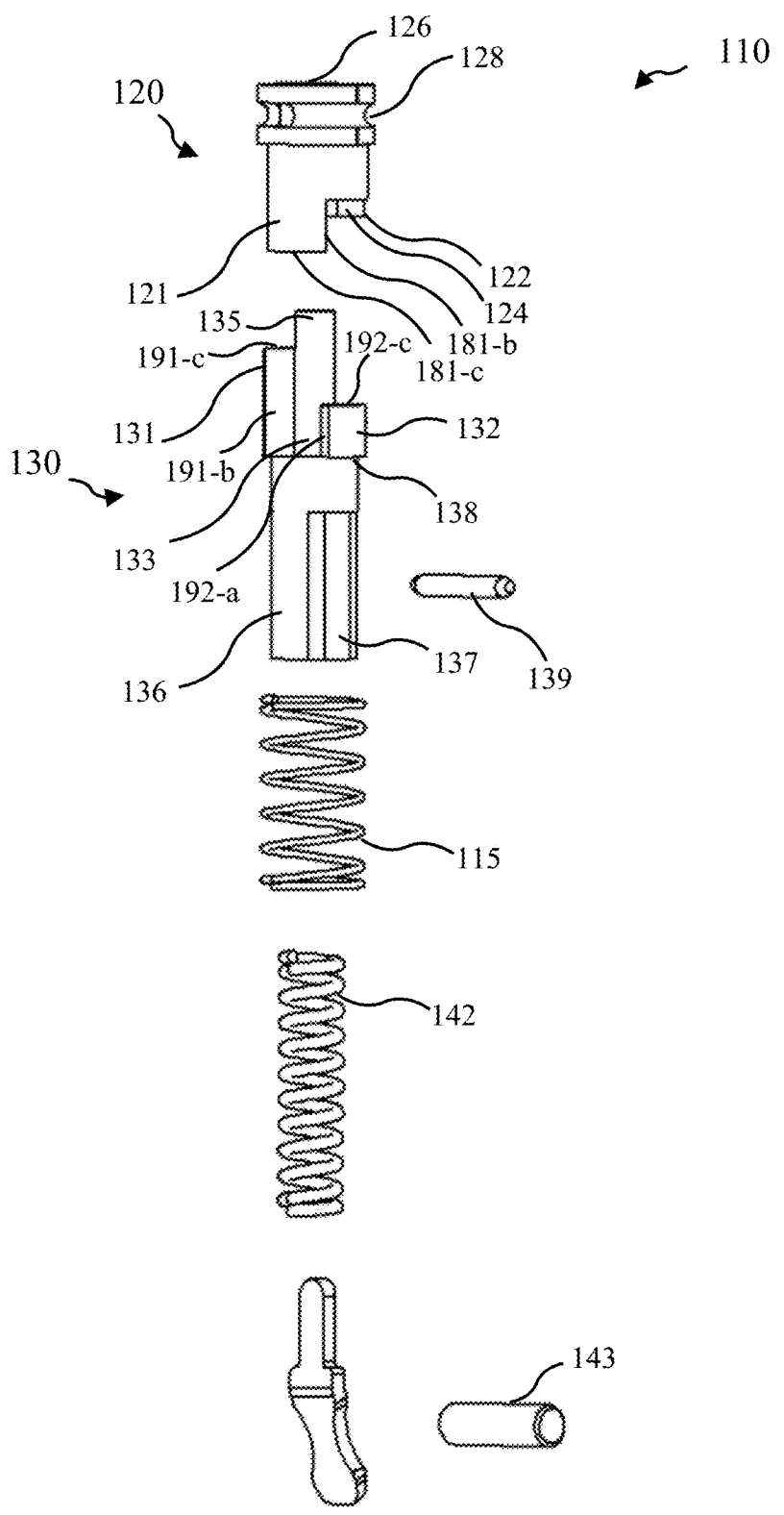
FIG. 6A and FIG. 6B show perspectives of an exploded view of a key-operated lock and carabiner gate in accordance with various embodiments.

FIG. 6A shows an exploded view of a key-operated lock 110 in accordance with various embodiments. For example, key-operated lock 110 may include a rotating element 120 and a sliding element 130. Key-operated lock 110 may include a spring 115. Rotating element 120 may include a lug 121 and a lug 122, where lug 121 may be longer than lug 122. Also shown is gap 124, which may generally be a short gap in comparison to another gap that is obscured from view (see FIG. 6B). Rotating element 120 may include a key aperture 126 and groove 128. The groove 128 may accept a pin 139 to help keep the key-operated lock 110 retained within a housing, such as a nose portion of a carabiner, while still allowing the rotating element 120 to rotate. The bolt 136 may include one or more flat faces 137 that may correspond to one or more flat faces of the carabiner (typically formed in the nose portion of the carabiner or other keying geometry) to facilitate keeping the sliding element 130 from rotating.

Sliding element 130 may include a lug 131 and a lug 132, where lug 131 may be longer than lug 132. Gap 133 may also be shown such that it may be a long gap in comparison to another gap that is obscured from view (see FIG. 6B). Depressor 135 may also be included that may facilitate sliding of the sliding element 130 when engaged by a key. Spring 115 may engage with sliding element 130 through engaging with the bottom portions of lugs 131 and/or 132; the bottom portions of lugs 131 and/or 132 may be referred to as protrusion(s) 138 of the sliding element 130 that may push against the spring 115 to engage the sliding element 130. The protrusion 138 may be formed from portions of the other portions of the sliding element 130 besides the bottom portions of the lugs 131 and/or 132.

Also shown in FIG. 6A are aspects of the gate mechanism, which may be included in key-locking carabiner devices. In particular, spring 142 may be included to help spring load a gate. Pin 143 may also be included to couple a gate with the body of a carabiner.

Figure 6B:
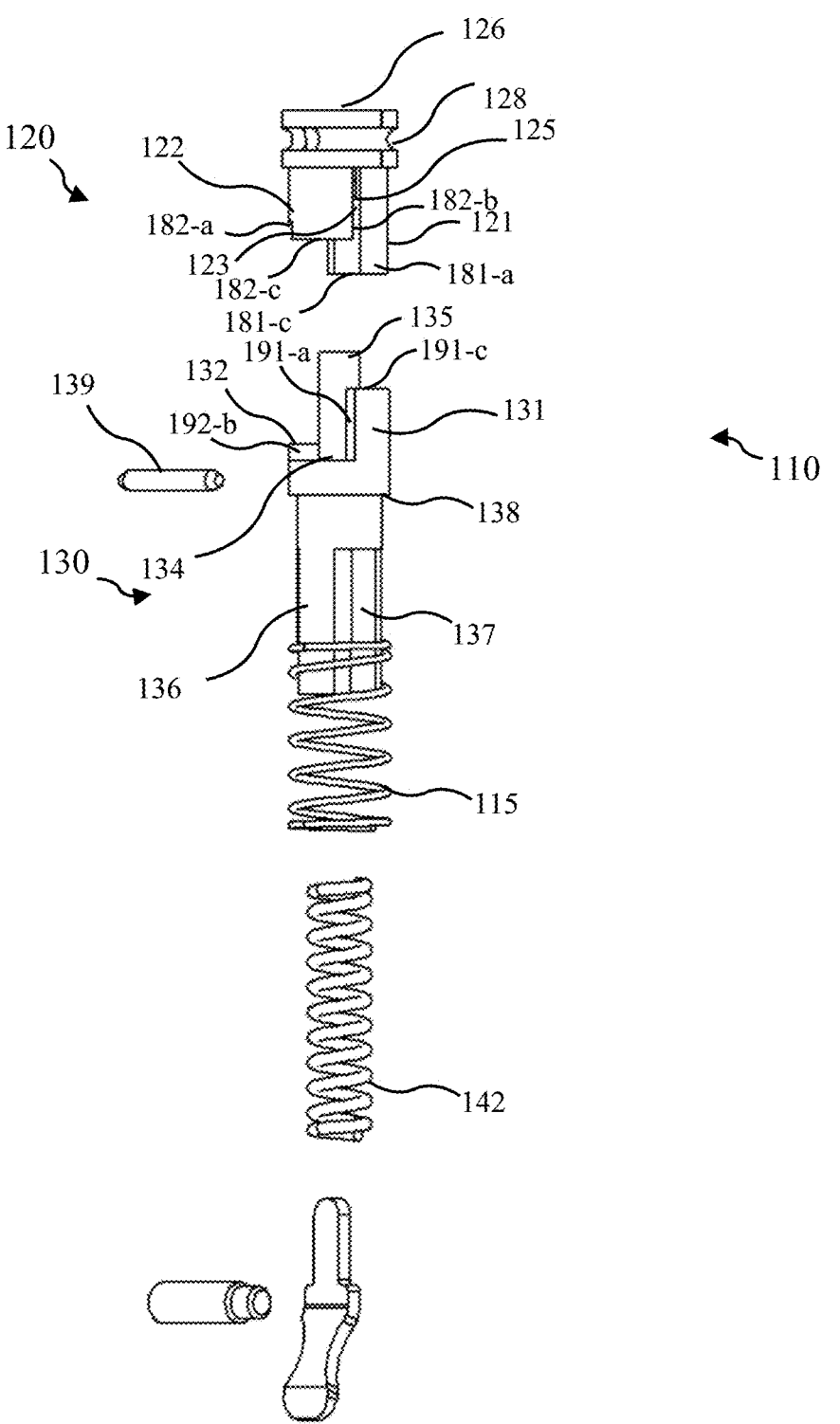

FIG. 6B shows another exploded view of the key-operated lock 110 of FIG. 6A, which may be seen as a 180 degree rotation with respect to FIG. 6A. From this view, a gap 123 of rotating element 120 may be seen, which may be longer or deeper than gap 124 shown in FIG. 6A. A gap 134 of sliding element 130 may be shorter than gap 133 of sliding element shown in FIG. 6A. The rotating element 120 may also include an aperture 125 to accept a depressor or protrusion 135 coupled with the sliding element 130.

The lugs 121, 122, 131, and 132 of FIG. 6A and/or FIG. 6B may each include two sides and an end. For example, lug 121 may include side 181-a, side 181-b, and end 181-c. Lug 122 may include side 182-a, side 182-b, and end 182-c. Lug 131 may include side 191-a, side 191-b, and end 191-c. Lug 132 may include side 192-a, side 192-b, and end 192-c.

Lug 131 of sliding element 130 may slide along lug 122 of rotating element 120 with a key inserted into rotating element 120; this may include side 191-a of lug 131 of the sliding element 130 sliding along side 182-b of lug 122 of rotating element 120 with the key being inserted into the rotating element 120.

Lug 131 may clear end 182-c of lug 122 such that the rotating element 120 may rotate with a rotation of the key. In some embodiments, lug 131 slides into gap 124 formed between lug 122 and lug 121 of rotating element 120 such that the bolt 136 remains in aperture of a gate of a carabiner to lock the gate of the carabiner in place. In some embodiments, side 191-b of lug 131 of sliding element 130 slides along side 182-a of lug 122 of rotating element 120 such that the bolt 136 remains in the aperture of the gate of the carabiner to lock the gate of the carabiner in place with the key being removed from the rotating element 120 of the key-operated lock 110.

Key-operated lock 110 of FIG. 6A and FIG. 6B may be an example of key-operated lock 110 of FIG. 1A, FIG. 1B, FIG. 1C, FIGS. 2A-2C, FIG. 3, FIG. 4, and/or FIG. 5

Turning now to FIG. 7A, FIG. 7B, FIG. 7C, FIG. 7D, FIG. 7E, and FIG. 7F, a locking sequence of a key-locked carabiner system 100 in accordance with various embodiments is provided. Key-locked carabiner system 100 of FIGS. 7A-7B may be an example of key-locked carabiner system 100 of FIG. 1A. Key-locked carabiner 101 of FIGS. 7A-7F may be an example of key-locked carabiner 101 of FIG. 1A, FIG. 1B, FIGS. 2A-2C, FIG. 3, FIG. 4, and/or FIG. 5. Key-operated lock 110 of FIGS. 7A-7F may be an example of key-operated lock 110 of FIG. 1A, FIG. 1B, FIG. 1C, FIGS. 2A-2C, FIG. 3, FIG. 4, FIG. 5, and/or FIGS. 6A-6B; carabiner 140 of FIGS. 7A-7 may be an example of carabiner 140 of FIG. 1A, FIG. 1B, FIG. 1D, FIGS. 2A-2C, FIG. 3, FIG. 4, and/or FIG. 5.

Figure 7A:
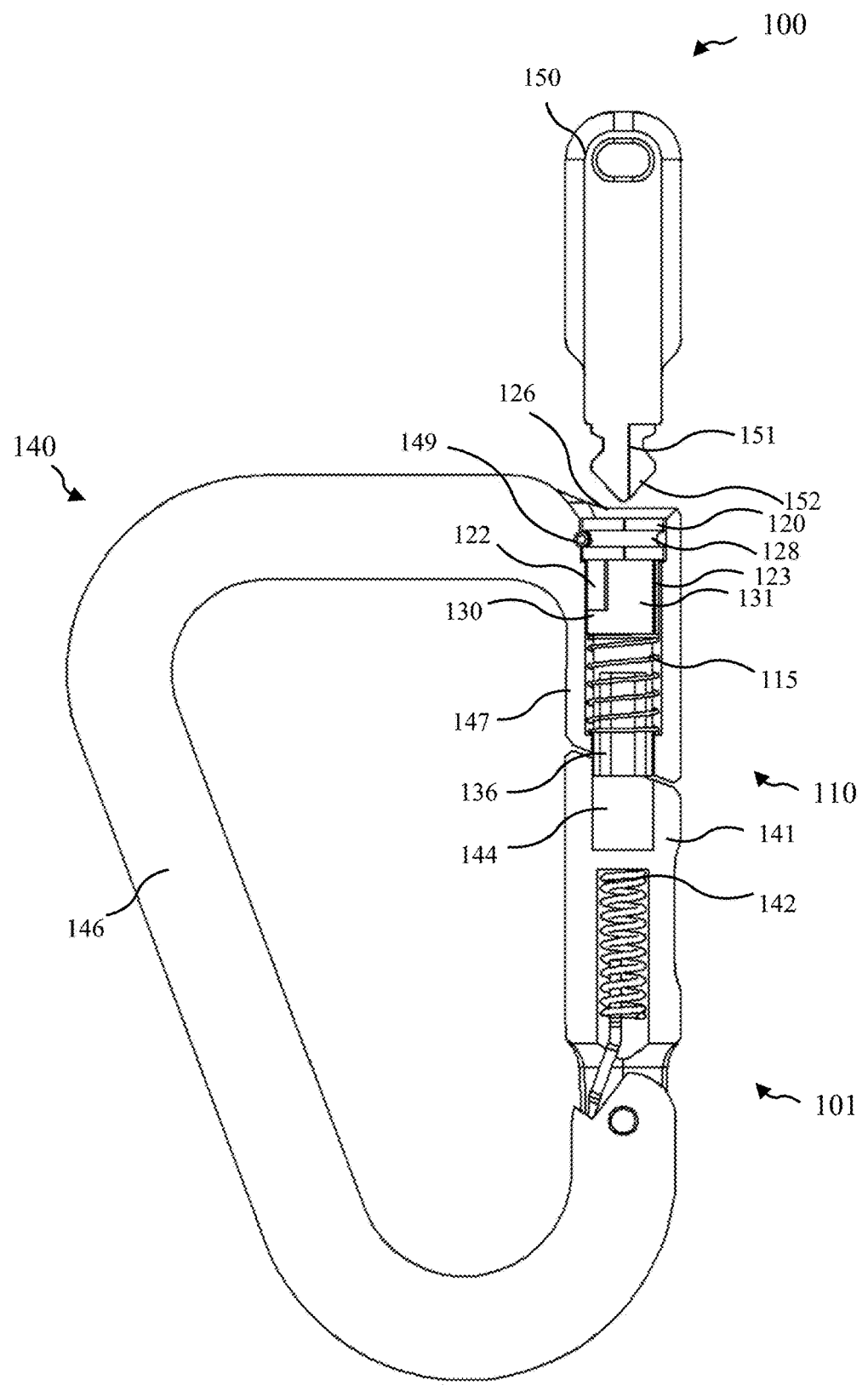
FIG. 7A, FIG. 7B, FIG. 7C, FIG. 7D, FIG. 7E, and FIG. 7F show a locking sequence from a key-operated lock for a key-locked carabiner system in accordance with various embodiments.

FIG. 7A shows key 150 prior to engaging with key-operated lock 110; key-operated lock 110 generally includes a first element 130, which may be referred to as a sliding element, a second element 120, which may referred to as a rotating element, and a spring 115, which may be housed within nose 147 of a carabiner 140. Rotating element 120 and sliding element 130 are shown in an unlocked state, where bolt 136 may not preclude gate 141 from opening. Rotating element 120 and sliding element 130 may be seated with each other such that lug 131 of sliding element 130 may fit within gap 123 of rotating element 120.

Figure 7B:
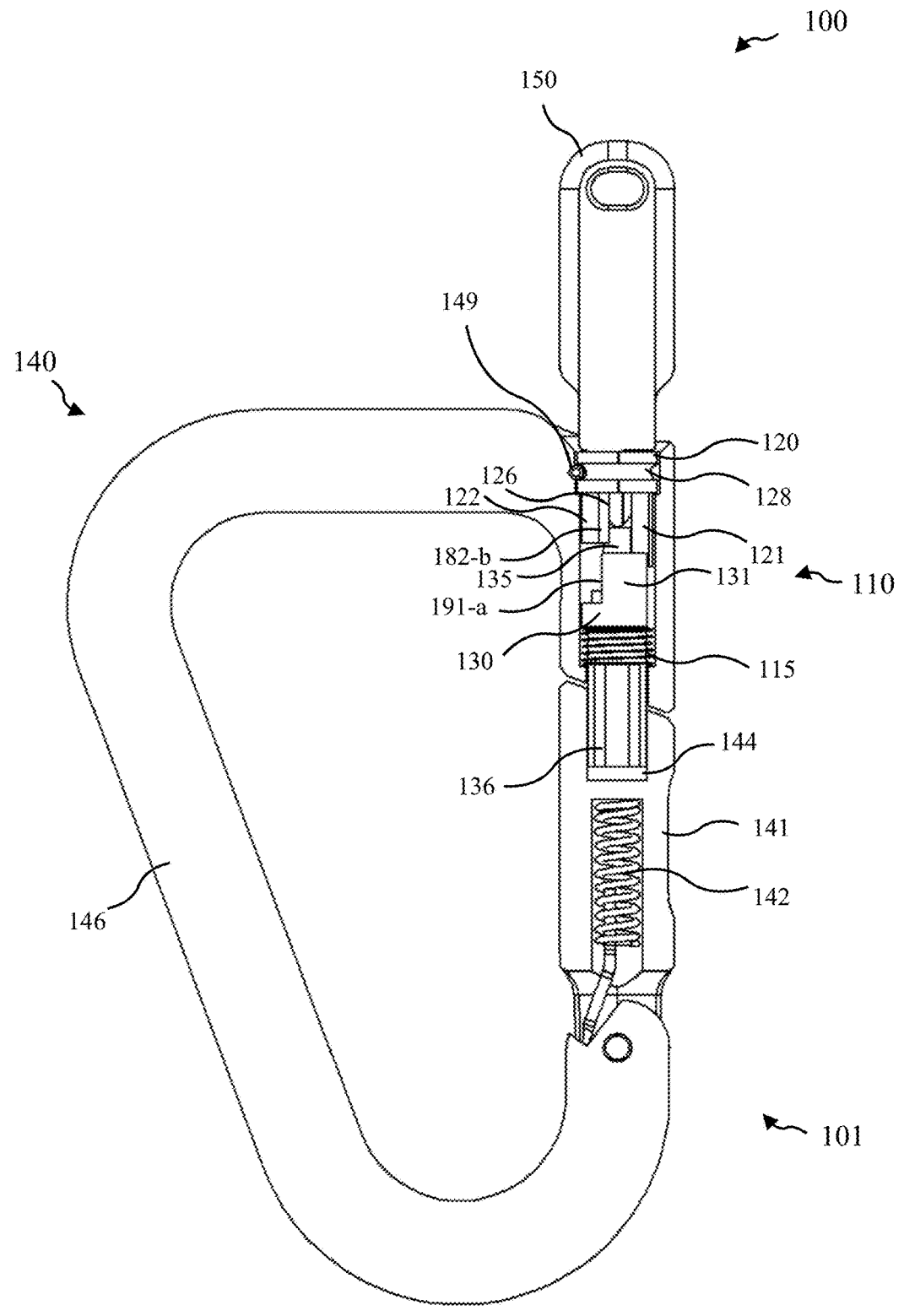

FIG. 7B shows key 150 inserted through key aperture 126 of rotating element 120 and pushing against depressor 135 coupled with sliding element 130. This may compress spring 115 and separate the rotating element 120 and sliding element 130 such that the rotating element 120 may now rotate utilizing key 150. Bolt 136 may also be inserted into opening 144 of gate 141 such that the gate 141 may now be precluded from opening. In addition, the sliding element 130 may be pushed far enough that lug 131 of sliding element 130 may clear lug 122 of rotating element 120, allowing rotating element 120 to rotate. Lug 121 of rotating element 120 may be long enough that lug 131 of sliding element 130 may be blocked on one side, allowing for the rotation of rotating element 120 in one direction into the locked configuration. Lug 131 of sliding element 130 may slide along lug 122 of rotating element 120 with key 150 inserted into rotating element 120; this may include side 191-a of lug 131 of the sliding element 130 sliding along side 182-b of lug 122 of rotating element 120 with the key 150 being inserted into the rotating element 120.

Figure 7C:
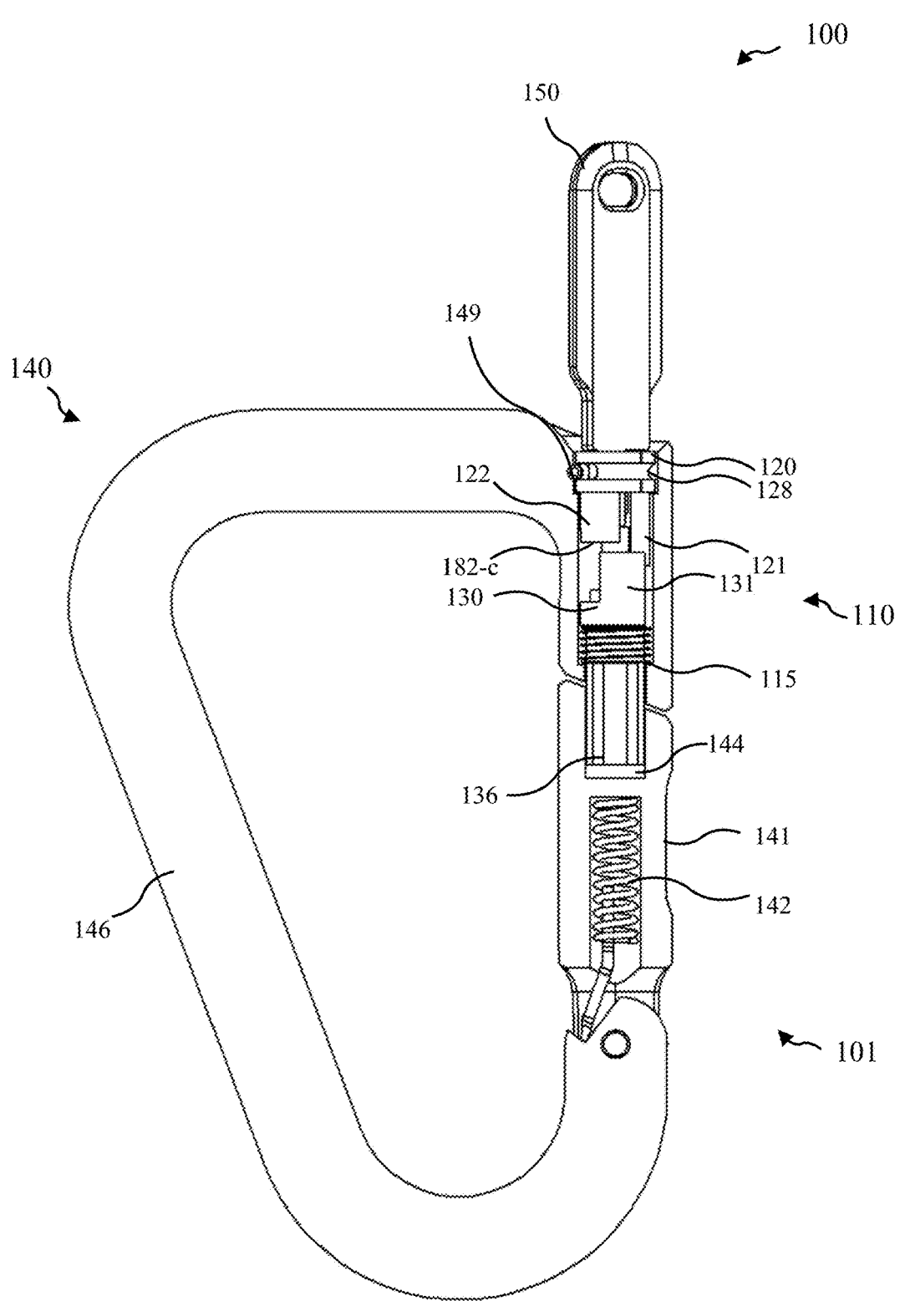
Figure 7D:
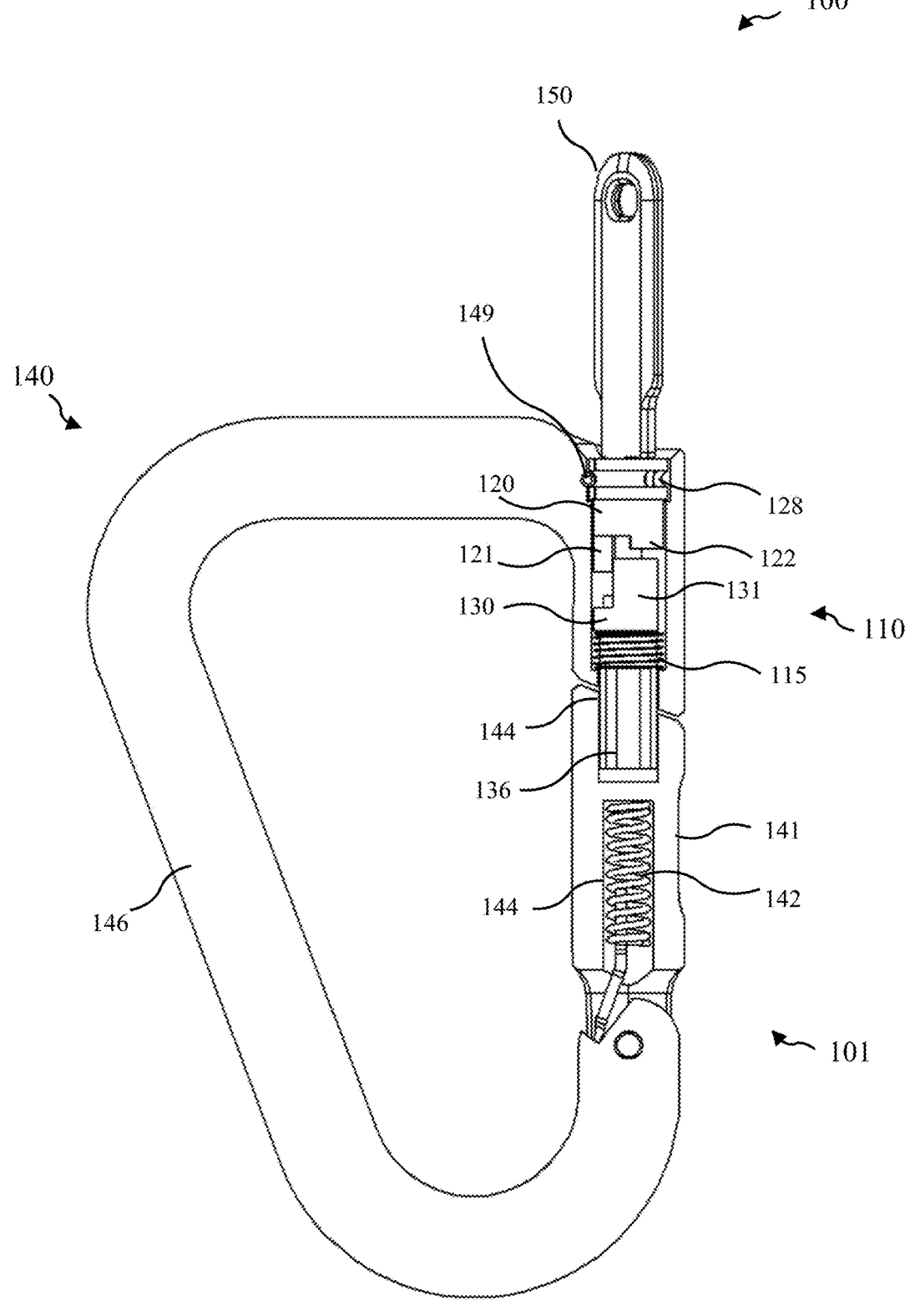

FIG. 7C generally shows aspects of that rotation of rotating element 120, where lug 131 of sliding element 130 may clear lug 122 of rotating element 120 as the key 150 rotates rotating element 120. For example, lug 131 may clear end 182-c of lug 122 such that the rotating element 120 may rotate with a rotation of the key 150. FIG. 7D shows the continued rotation of rotating element 120.

Figure 7E:
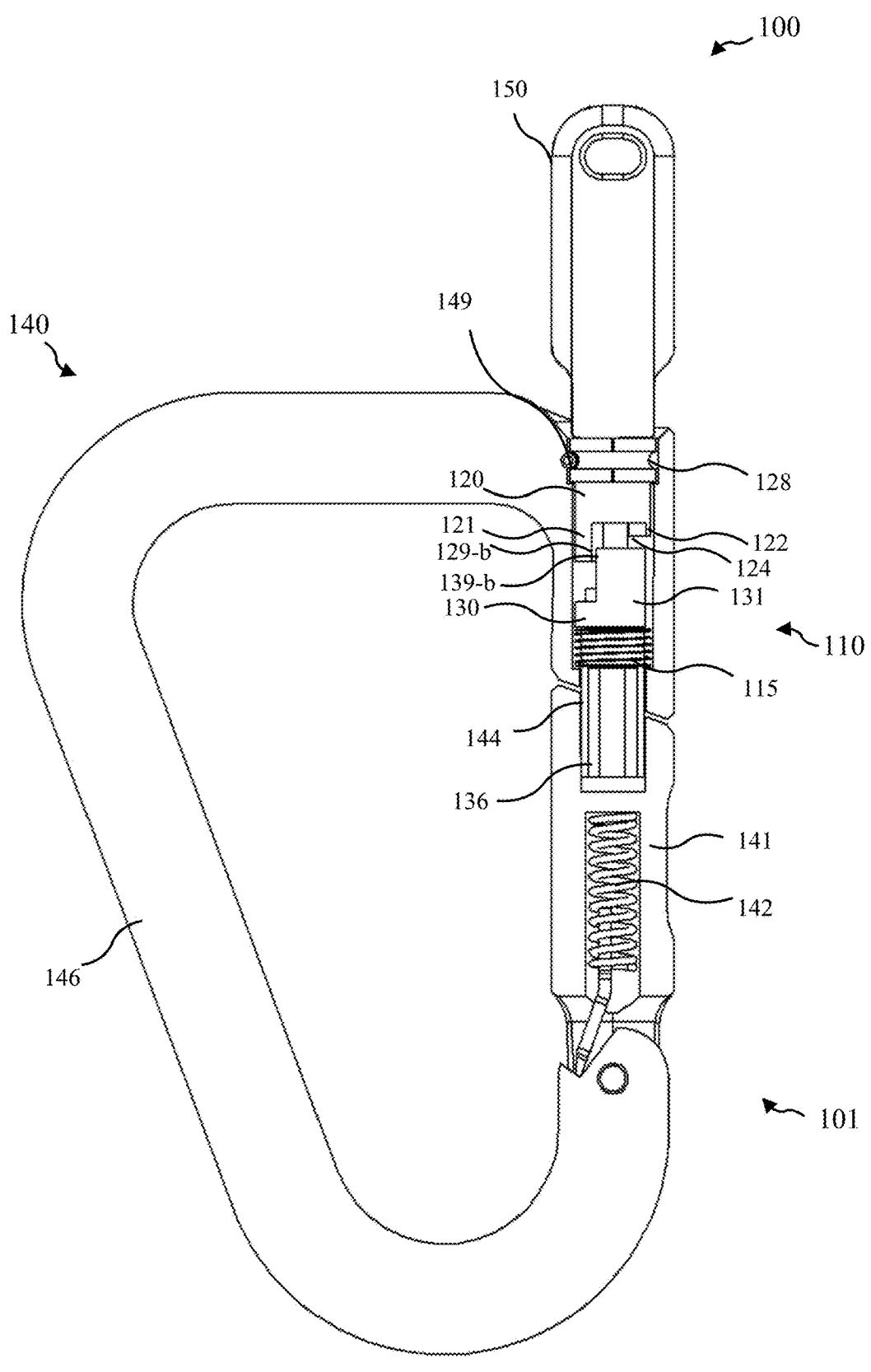

FIG. 7E shows that sequence when the lug 131 of sliding element 130 may align with the gap 124 of rotating element 120. With gap 124 not being as deep as gap 123, when spring 115 pushes against sliding element 130, bolt 136 may remain in gate opening 144, such that the gate 141 is now in a locked position. A side 139-b of lug 131 of sliding element 130 may also hit a side 129-b of lug 121 of rotating element 120, reflecting that the rotating element 120 has achieved its locked position.

Figure 7F:
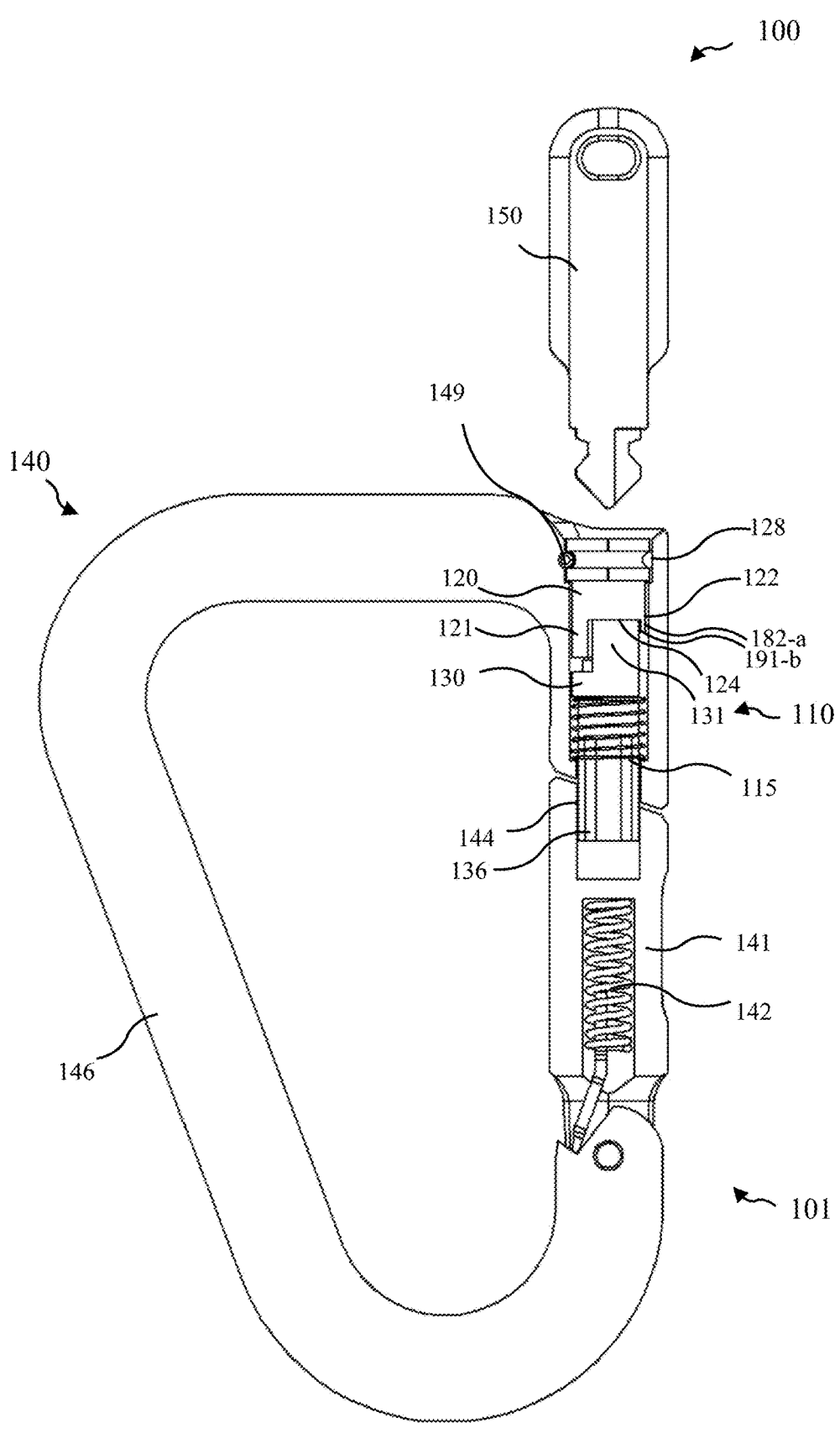

FIG. 7F shows key 150 being removed from key-operated lock 110, leaving bolt 136 in gate opening 144 as lug 131 of sliding element 130 slides into gap 124 of rotating element 120. For example, lug 131 may slide into gap 124 formed between lug 122 and lug 121 of rotating element 120 such that the bolt 136 remains in aperture 144 of gate 141 of a carabiner 140 to lock the gate 141 of the carabiner 140 in place. In some embodiments, side 191-b of lug 131 of sliding element 130 slides along side 182-a of lug 122 of rotating element 120 such that the bolt 136 remains in the aperture 144 of the gate 141 of the carabiner 140 to lock the gate 141 of the carabiner 140 in place with the key 150 being removed from the rotating element 120 of the key-operated lock 110. Now key-operated lock 110 is shown in a locked state.

To unlock key-operated lock 110, the sequence shown in FIGS. 7A-7F may be done in reverse, from FIG. 7F to FIG. 7A.

Figure 8A:
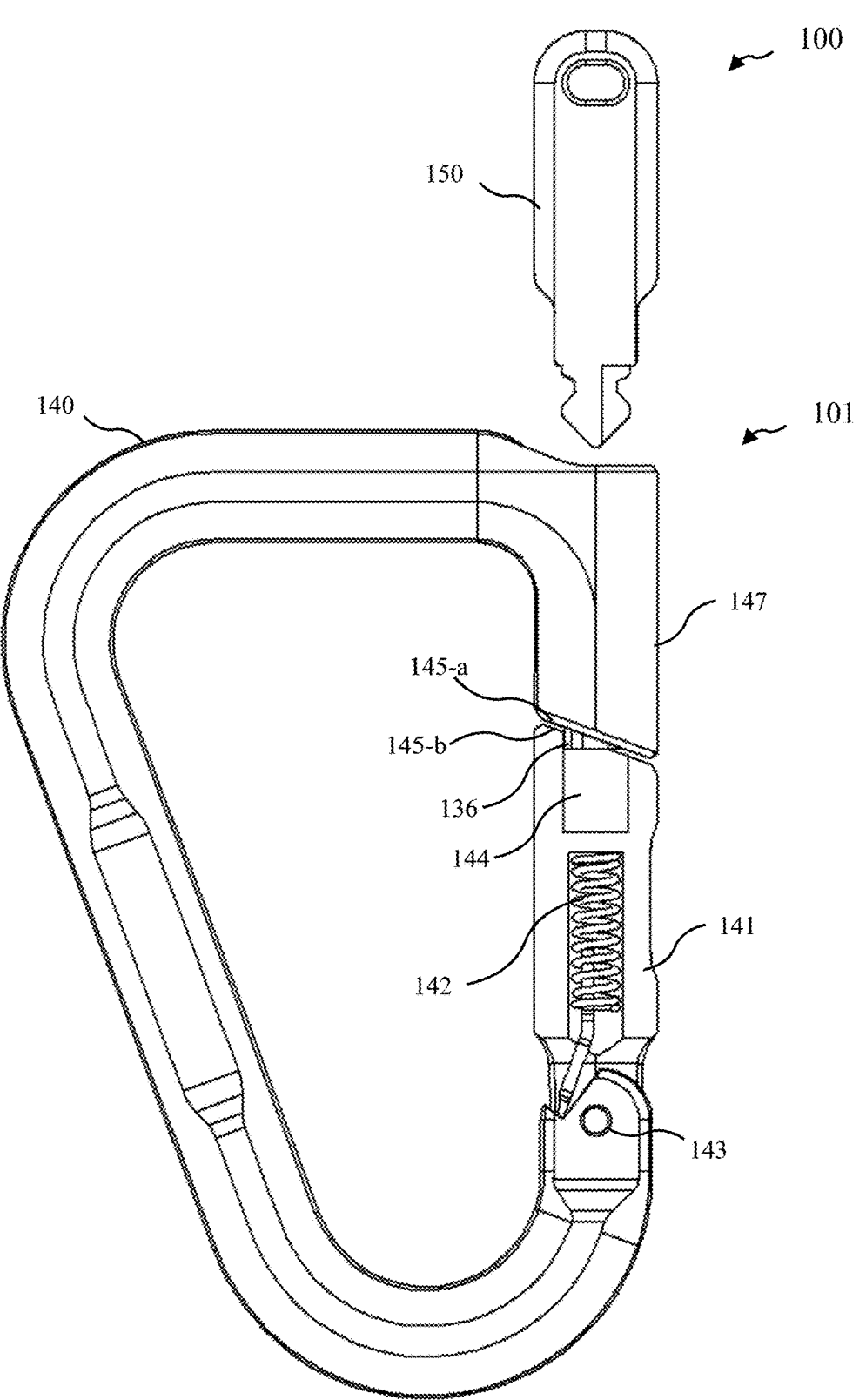
FIG. 8A, FIG. 8B, and FIG. 8C show a locking sequence from a key-operated lock for a key-locked carabiner system in accordance with various embodiments.
Figure 8B:
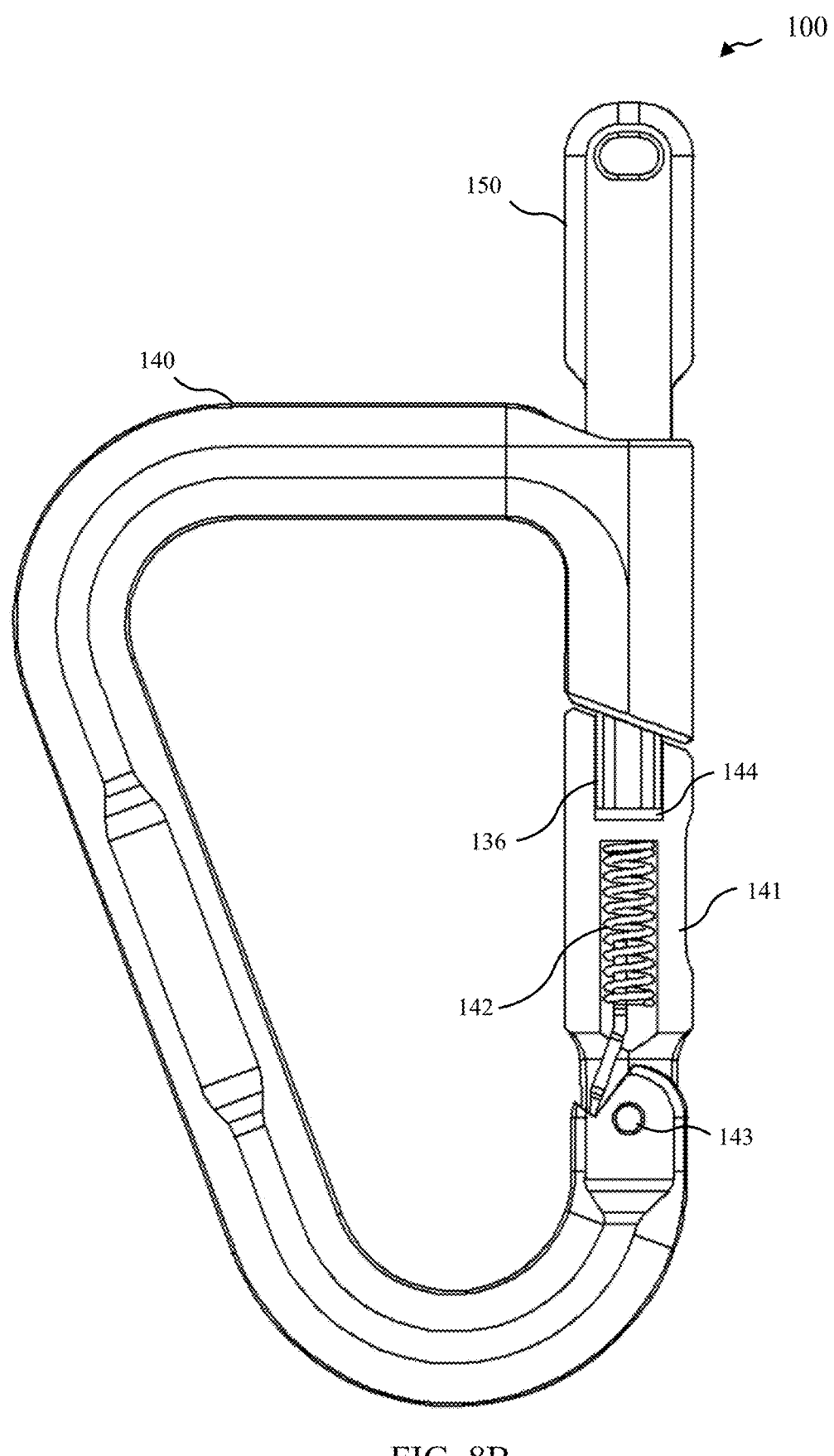
Figure 8C:
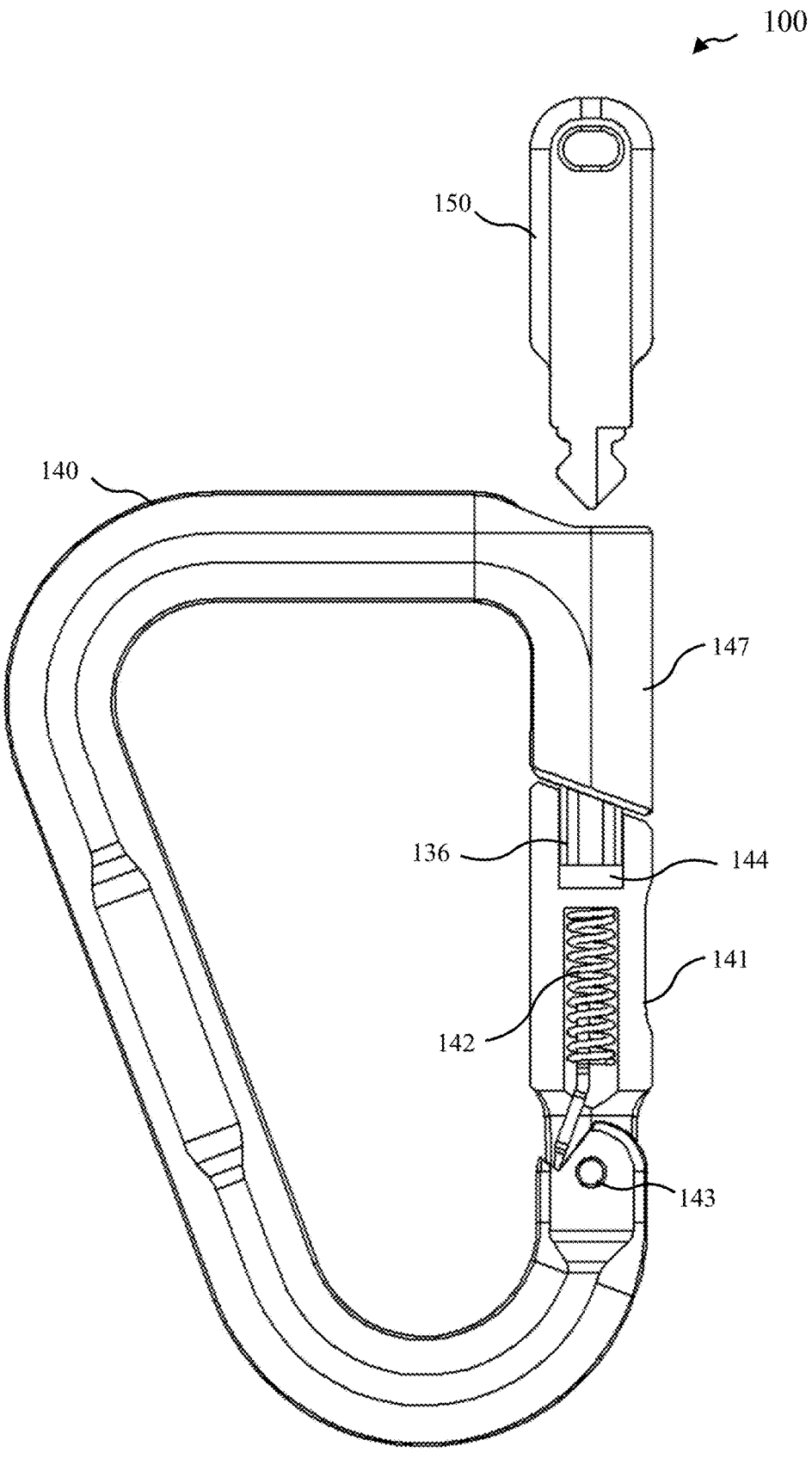

Turning now to FIG. 8A, FIG. 8B, and FIG. 8C, a locking sequence of a key-locked carabiner system 100 in accordance with various embodiments is provided. Key-locked carabiner system 100 of FIGS. 8A-8C may be an example of key-locked carabiner system 100 of FIG. 1A and/or FIGS. 7A-7F.

The key-locked carabiner device 101 may include a carabiner 140 and a lock (obscured from view except for bolt portion 136) coupled with the carabiner 140 that locks the gate 141 of the carabiner 140. The lock may be housed within the nose portion 147 of carabiner 140. The lock is generally operated with a key 150 to form a key-operated lock. The key-operated lock coupled with the carabiner 140 includes the bolt 136 that extends from the nose portion 147 of the carabiner 140 into an aperture 144 of the gate 141 of the carabiner 140 to preclude the gate 141 of the carabiner 140 from opening when in a locked state.

These figures generally also show the gate 141 of the carabiner 140 that may include at least an angled face or stepped face 145-b that matches at least an angled face or stepped face 145-a of the nose portion 147 of the carabiner 140.

The locking sequence shown in FIG. 8A, FIG. 8B, and FIG. 8C generally shows the system going from an unlocked state to a locked state. In particular, these figures generally emphasize the insertion, rotation, and removal of key 150 along with the changing position of the bolt 136 of the key-operated lock housed within the nose portion 147 of the carabiner 140.

FIG. 8A shows a unlocked state where bolt 136 may partially extend from at least the angled face or the stepped face 145-b of the nose portion 147 of the carabiner 140 in an unlocked state. This may help keep the bolt 136 aligned with the gate 141 and may help avoid tolerance issues in design. FIG. 8B shows key 150 inserted into the key-operated lock housed within the nose portion 147 of the carabiner 140, which extends the bolt 136 into the aperture 144 of gate 141 of the carabiner 140. The key 150 may be rotated and then removed, which may be shown in FIG. 8C, leaving the bolt 136 extended into aperture 144 of gate 141 of carabiner 140, resulting in a locked state. In some cases, removal of key 150 will result in bolt 136 partially receding within aperture 144 of gate 141 of carabiner 140, while maintaining the locked state.

Figure 9A:
FIG. 9A and FIG. 9B show keys in accordance with various embodiments.
Figure 9A:
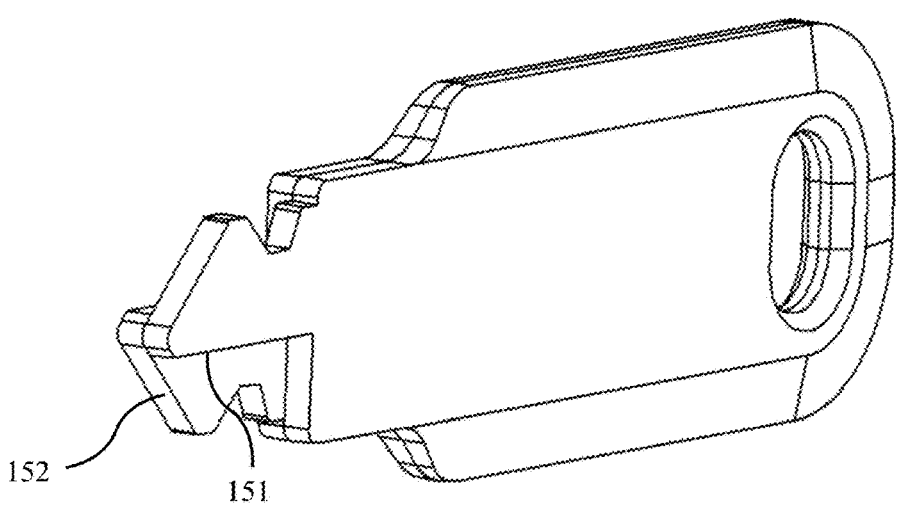
Figure 9B:
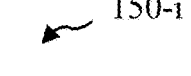
Figure 9B:
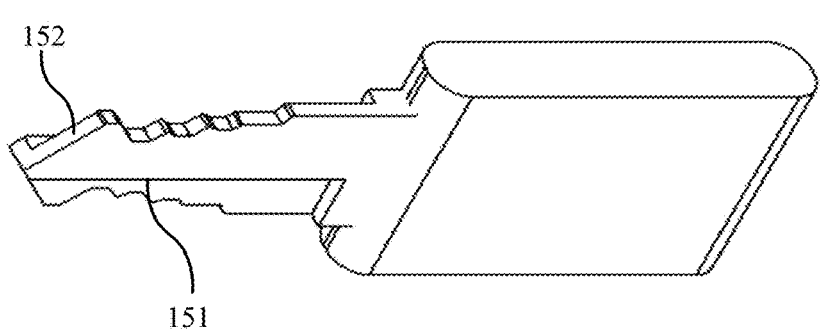

FIG. 9A show an example of a key 150 in accordance with various embodiments. The key 150 may include a variety of configurations. In some embodiments, the key 150 may include a zig zag or z-shaped cross section 151, which may match the shape of the key aperture of a key-operated lock in accordance with various embodiments. In some embodiments, the key 150 may include a v-shaped tip 152, which may match a v-shaped portion of a key-operated lock in accordance with various embodiments. This v-shaped tip 152 of the key 150 may match a TSA007 key's tip, allowing a TSA 007 key to open the key-operated lock. The key 150, however, may be designed so it may not open other locks that a TSA007 may typically open. FIG. 9B shows an example of a TSA007 key 150-i, with its typical v-shaped tip 152 and zig zag or z-shaped cross section 151. Keys 150 and 150-i may operate the various key-operated locks 110 shown throughout the various figures.

Figure 10:
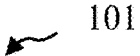
FIG. 10 shows aspects of a key-operated lock of a key-locked carabiner device in accordance with various embodiments.
Figure 10:
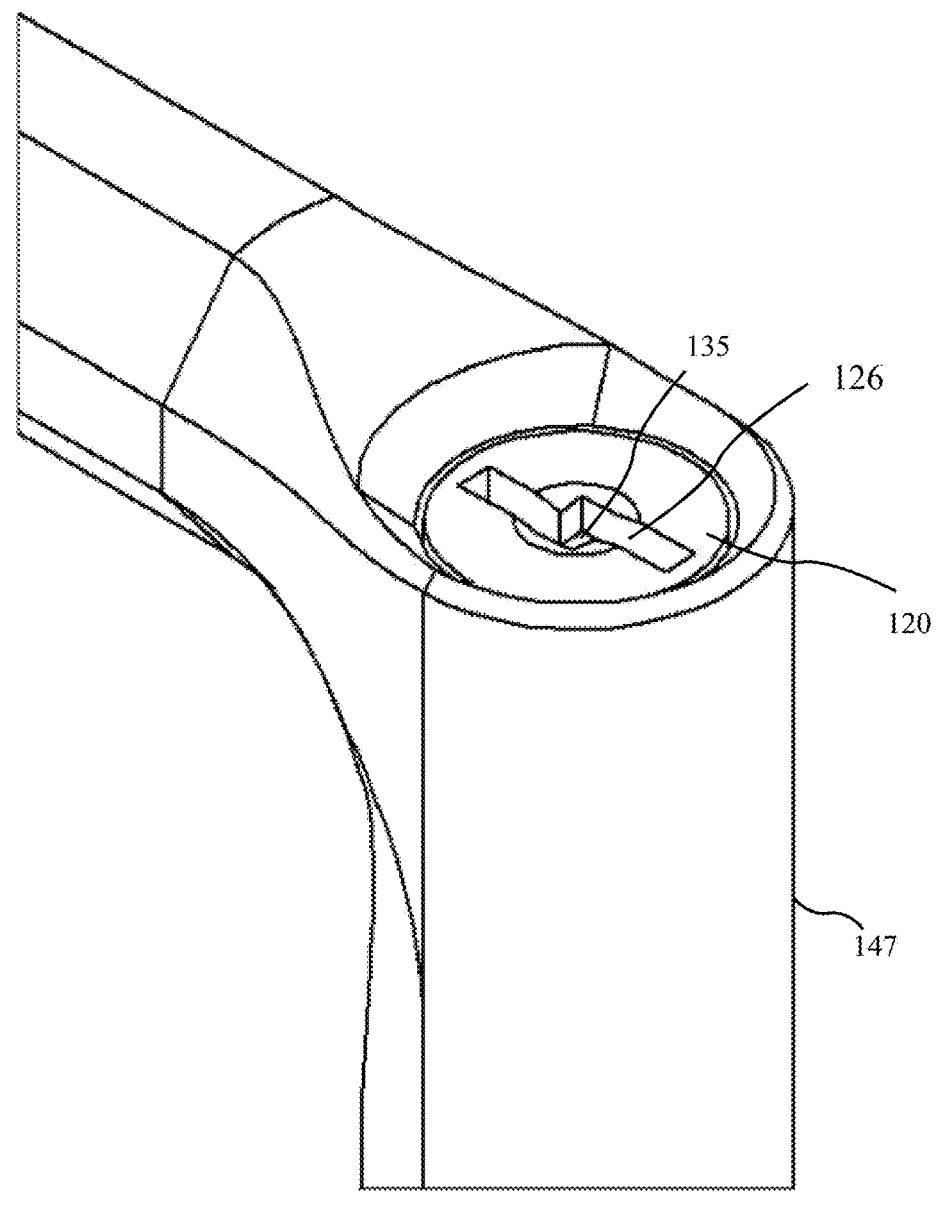

FIG. 10 shows aspects of a key-locked carabiner 101 in accordance with various embodiments. In particular, FIG. 10 shows portions of a key-operated lock 110 including a rotating element 120 that may include a key aperture 126. Key aperture 126 may include a zig zag or z-shape to match a cross section of a key; other shapes may be utilized. The key-operated lock 110, including rotating element 120 may be housed in the nose 147 of the carabiner. FIG. 10 may also show a depressor 135 that may be coupled with a sliding element. The key that unlocks and locks the key-operated lock may press against the depressor 135 when the key is inserted into the key aperture 126, which may slide the sliding element and may result in a bolt engaging or entering an opening of a gate of a carabiner to lock the gate into position. Key-locked carabiner 101 of FIG. 10 may be an example of key-locked carabiner 101 of FIG. 1A, FIG. 1B, FIGS. 2A-2C, FIG. 3, FIG. 4, FIG. 5, FIGS. 7A-7F, and/or FIGS. 8A-C.

Figure 11A:
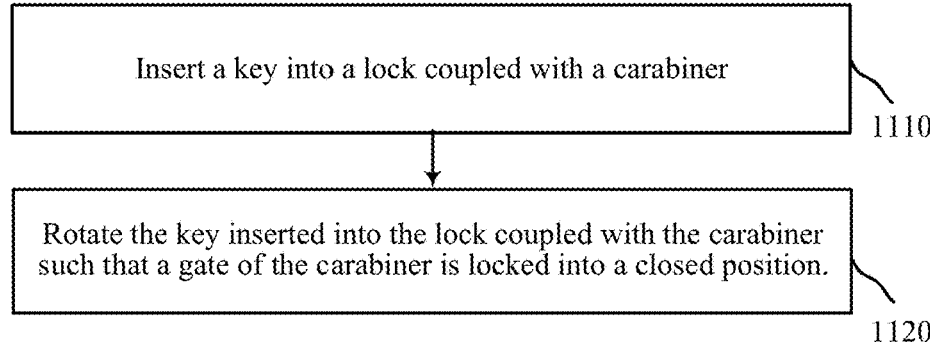
FIG. 11A shows a flow diagram of a method in accordance with various embodiments.

Turning now to FIG. 11A, a flow diagram of a method 1100 is shown in accordance with various embodiments. Method 1100 may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 3, FIG. 4, FIG. 5, FIG. 6A, FIG. 6B, FIG. 7A, FIG. 7B, FIG. 7C, FIG. 7D, FIG. 7E, FIG. 7F, FIG. 8A, FIG. 8B, FIG. 8C, FIG. 9A, FIG. 9B, and/or FIG. 10.

At block 1110, a key may be inserted into a lock coupled with a carabiner. At block 1120, the key inserted into the lock coupled with the carabiner may be rotated such that a gate of the carabiner is locked into a closed position. In some embodiments, inserting the key into the lock coupled with the carabiner includes extending a bolt of the lock into an aperture of the gate of the carabiner that precludes the gate from opening. In some embodiments, inserting the key into the lock coupled with the carabiner includes sliding a sliding element of the lock such that the bolt of the lock extends into the aperture of the gate of the carabiner. In some embodiments, inserting the key into the lock coupled with the carabiner includes inserting the key into a rotating element of the lock.

In some embodiments of the method 1100, sliding the sliding element of the lock includes sliding a first lug of the sliding element of the lock with respect to a first lug of the rotating element of the lock. In some embodiments, rotating the key inserted into the lock coupled with the carabiner includes rotating the rotating element of the lock after the first lug of the sliding element of the lock clears an end of the first lug of the rotating element of the lock. In some embodiments, the gate of the carabiner is locked in a closed position when the first lug of the sliding element of the lock slides into a gap formed between the first lug of the rotating element and a second lug of the rotating element.

Some embodiments of the method 1100 further include actuating the sliding element of the lock with a spring. In some embodiments, rotating the rotating element of the lock after the first lug of the sliding element of the lock clears the end of the first lug of the rotating element of the lock includes rotating the rotating element of the lock with respect to a pin inserted through one or more apertures of the carabiner. In some embodiments, the pin runs through a groove formed in the rotating element of the lock.

In some embodiments of the method 1100, sliding the first lug of the sliding element of the lock with respect to the first lug of the rotating element of the lock includes sliding the first lug of the sliding element of the lock with respect to a first side of the first lug of the rotating element of the lock.

In some embodiments, the gate of the carabiner is locked in a closed position when the first lug of the sliding element of the lock slides with respect to a second side of the first lug of the rotating element as they key is removed from the rotating element.

Some embodiments of the method 1100 utilize a standardized key. The standardized key may include a TSA007 key. In some embodiments, inserting the key into the lock coupled with the carabiner includes inserting the key into a nose portion of the carabiner. In some embodiments, the lock coupled with the carabiner is positioned within the nose portion of the carabiner.

Figure 11B:
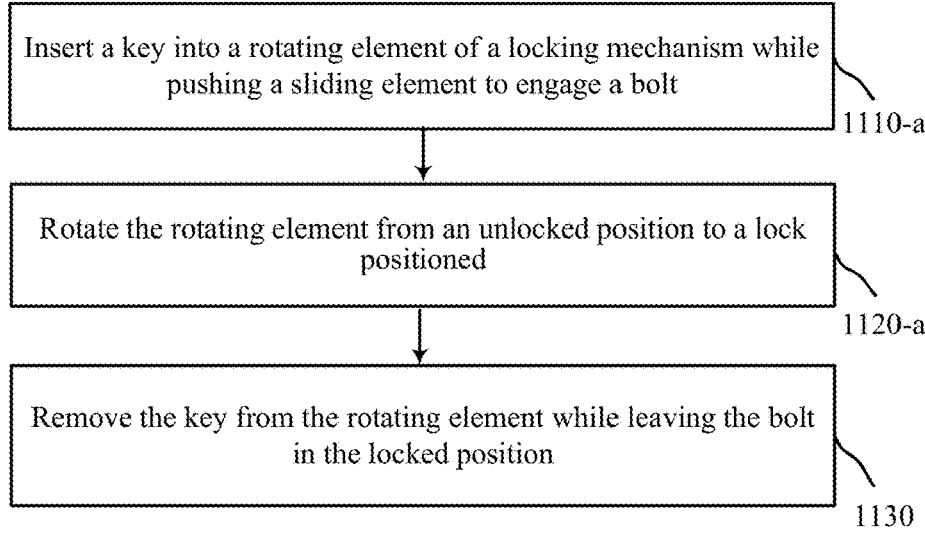
FIG. 11B shows a flow diagram of a method in accordance with various embodiments.

Turning now to FIG. 11B, a flow diagram of a method 1100-*a* is shown in accordance with various embodiments. Method 1100-*a* may be implemented utilizing a variety of systems and/or devices such as those shown and/or described with respect to FIG. 1A, FIG. 1B, FIG. 1C, FIG. 1D, FIG. 2A, FIG. 2B, FIG. 2C, FIG. 3, FIG. 4, FIG. 5, FIG. 6A, FIG. 6B, FIG. 7A, FIG. 7B, FIG. 7C, FIG. 7D, FIG. 7E, FIG. 7F, FIG. 8A, FIG. 8B, FIG. 8C, FIG. 9A, FIG. 9B, and/or FIG. 10. Method 1100-*a* may be an example of method 1100.

At block 1110-*a*, a key may be inserted into a rotating element of a key-operated lock while pushing a sliding element to engage a bolt. This may involve pushing against a depressor coupled with the sliding element. This may also compress a spring and separate the rotating element and sliding element such that the rotating element may now rotate utilizing the key. Engaging the bolt may include inserting the bolt into an opening, such as an opening in a carabiner gate, such that the carabiner gate may now be precluded from opening; similar openings may be formed in other devices that may utilize this key-operated lock. In addition, the sliding element may be pushed far enough that a lug of the sliding element may clear a lug of the rotating element, allowing the rotating element to rotate. The lug of the rotating element may be long enough that the lug of sliding element may be blocked on one side, allowing for rotation of that rotating element in one direction into a locked configuration. At block 1120-*a*, the rotating element may be rotated from an unlocked position to a locked position. This locked position may include an alignment where the long lug of the sliding element may align with a short gap of the rotating element. At block 1130, the key may be removed from the rotating element while leaving the bolt in the locked position. With a short gap not being as deep as a gap that the lug of the sliding element slides into in the unlocked position, the bolt may remain in the locked position. A spring may push against the sliding element to facilitate the locking process and unlocking process.

These embodiments may not capture the full extent of combinations and permutations of materials and process equipment. However, they may demonstrate the range of applicability of the methods, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A device comprising:
   a carabiner that includes a nose at a distal end of the carabiner; and
   a lock coupled with the carabiner that locks a gate of the carabiner, wherein the lock is operated with a key to form a key-operated lock that is positioned within the nose of the carabiner.

2. The device of claim 1, wherein the key-operated lock coupled with the carabiner includes a bolt that extends from the nose of the carabiner into an aperture of the gate of the carabiner to preclude the gate of the carabiner from opening.

3. The device of claim 2, wherein the key-operated lock coupled with the carabiner includes a first element that is coupled with the bolt and slides within the nose of the carabiner to extend the bolt from the nose of the carabiner into the aperture of the gate of the carabiner to preclude the gate of the carabiner from opening.

4. The device of claim 3, wherein the key pushes against a portion of the first element to extend the bolt from the nose of the carabiner into the aperture of the gate of the carabiner to preclude the gate of the carabiner from opening.

5. The device of claim 4, wherein the key-operated lock coupled with the carabiner includes a second element such that the key inserts into the second element of the key-operated lock and the key rotates the second element of the key-operated lock within the nose of the carabiner.

6. The device of claim 5, wherein the first element of the key-operated lock and the second element of the key-operated lock each include one or more lugs, wherein a first lug of the first element of the key-operated lock slides along a first lug of the second element of the key-operated lock with the key being inserted into the second element of the key-operated lock.

7. The device of claim 6, wherein the first lug of the first element of the key-operated lock clears an end of the first lug of the second element of the key-operated lock such that the second element of the key-operated lock rotates with a rotation of the key.

8. The device of claim 7, wherein the first lug of the first element of the key-operated lock slides into a gap formed between the first lug of the second element of the key-operated lock and a second lug of the second element of the key-operated lock such that the bolt remains in the aperture of the gate of the carabiner to lock the gate of the carabiner in place.

9. The device of claim 7, wherein:

the first lug of the first element of the key-operated lock sliding along the first lug of the second element of the key-operated lock with the key being inserted into the second element of the key-operated lock includes the first lug of the first element of the key-operated lock sliding along a first side of the first lug of the second element of the key-operated lock with the key being inserted into the second element of the key-operated lock; and the first lug of the first element of the key-operated lock slides along a second side of the first lug of the second element of the key-operated lock such that the bolt remains in the aperture of the gate of the carabiner to lock the gate of the carabiner in place with the key being removed from the second element of the key-operated lock.

10. The device of claim 3, wherein the key-operated lock includes a spring that pushes against the first element of the key-operated lock.

11. The device of claim 1, wherein the key includes a standardized key.

12. The device of claim 11, wherein the standardized key includes a TSA007 key.

13. The device of claim 5, wherein the second element of the key-operated lock includes a shaped groove to accept a matching shaped tip of the key.

14. The device of claim 1, wherein the gate of the carabiner includes at least an angled face or stepped face that matches at least an angled face or stepped face of the nose of the carabiner.

15. The device of claim 14, wherein the bolt partially extends from at least the angled face or the stepped face of the nose of the carabiner in an unlocked state.

16. The device of claim 5, further comprising:

an aperture in the nose of the carabiner;

a pin that inserts into the aperture in the nose of the carabiner; and a groove in the second element of the key-operated lock that the pin runs through such that the second element of the key-operated lock is retained within the nose of the carabiner and the second element of the key-operated lock rotates with the pin running through the groove of the second element of the carabiner.

17. A method comprising:

inserting a key into a lock coupled with a carabiner, wherein:

the carabiner includes a nose at a distal end of the carabiner; and the lock is positioned within the nose of the carabiner; and rotating the key inserted into the lock coupled with the carabiner such that a gate of the carabiner is locked into a closed position.

18

18. The method of claim 17, wherein inserting the key into the lock coupled with the carabiner extends a bolt of the lock into an aperture of the gate of the carabiner that precludes the gate from opening.

19. The method of claim 18, wherein inserting the key into the lock coupled with the carabiner includes sliding a sliding element of the lock such that the bolt of the lock extends into the aperture of the gate of the carabiner.

20. The method of claim 19, wherein inserting the key into the lock coupled with the carabiner includes inserting the key into a rotating element of the lock.

21. The method of claim 20, wherein sliding the sliding element of the lock includes sliding a first lug of the sliding element of the lock with respect to a first lug of the rotating element of the lock.

22. The method of claim 21, wherein rotating the key inserted into the lock coupled with the carabiner includes rotating the rotating element of the lock after the first lug of the sliding element of the lock clears an end of the first lug of the rotating element of the lock.

23. The method of claim 22, wherein the gate of the carabiner is locked in a closed position when the first lug of the sliding element of the lock slides into a gap formed between the first lug of the rotating element and a second lug of the rotating element.

24. The method of claim 17, wherein the key includes a standardized key.

25. The method of claim 19, further comprising actuating the sliding element of the lock with a spring.

26. The method of claim 22, wherein rotating the rotating element of the lock after the first lug of the sliding element of the lock clears the end of the first lug of the rotating element of the lock includes rotating the rotating element of the lock with respect to a pin inserted through one or more apertures of the carabiner and the pin runs through a groove formed in the rotating element of the lock.

27. The method of claim 21, wherein:

sliding the first lug of the sliding element of the lock with respect to the first lug of the rotating element of the lock includes sliding the first lug of the sliding element of the lock with respect to a first side the first lug of the rotating element of the lock; and further comprising locking the gate of the carabiner in a closed position when the first lug of the sliding element of the lock slides with respect to a second side the first lug of the rotating element as the key is removed from the rotating element.

28. The device of claim 1, wherein:

the key-operated lock coupled with the carabiner includes a bolt that extends from the nose of the carabiner into an aperture of the gate of the carabiner to preclude the gate of the carabiner from opening such that the aperture of the gate of the carabiner is positioned at a first end of the gate of the carabiner and the gate of the carabiner is coupled with a frame of the carabiner at a second end of the gate.

29. The method of claim 17, wherein:

an aperture of the gate of the carabiner is positioned at a first end of the gate of the carabiner and the gate of the carabiner is coupled with a frame of the carabiner at a second end of the gate.

* * * * *